United States Patent
LeFiles et al.

(10) Patent No.: US 11,503,829 B2
(45) Date of Patent: Nov. 22, 2022

(54) PESTICIDAL COMPOSITIONS AND RELATED METHODS

(71) Applicant: CJB Applied Technologies, LLC, Valdosta, GA (US)

(72) Inventors: James Holt LeFiles, Valdosta, GA (US); Paul Andrew Patterson, Valdosta, GA (US)

(73) Assignee: GJB APPLIED TECHNOLOGIES, INC., Valdosta, GA (US)

( * ) Notice: Subject to any disclaimer, the term of this patent is extended or adjusted under 35 U.S.C. 154(b) by 0 days.

(21) Appl. No.: 17/315,476

(22) Filed: May 10, 2021

(65) Prior Publication Data

US 2021/0345608 A1 Nov. 11, 2021

Related U.S. Application Data

(60) Provisional application No. 62/704,411, filed on May 8, 2020.

(51) Int. Cl.

| A01N 25/04 | (2006.01) |
|---|---|
| A01N 25/22 | (2006.01) |
| A01N 25/24 | (2006.01) |
| A01N 31/04 | (2006.01) |
| A01N 43/40 | (2006.01) |
| A01N 47/36 | (2006.01) |

(52) U.S. Cl.
CPC ............. *A01N 31/04* (2013.01); *A01N 25/04* (2013.01); *A01N 25/22* (2013.01); *A01N 25/24* (2013.01); *A01N 43/40* (2013.01); *A01N 47/36* (2013.01)

(58) Field of Classification Search
CPC ........ A01N 31/04; A01N 25/04; A01N 25/22; A01N 25/24; A01N 43/40; A01N 47/36

USPC .......................................................... 514/245
See application file for complete search history.

(56) References Cited

U.S. PATENT DOCUMENTS

| 2009/0105073 | A1 | 4/2009 | Taranta et al. | |
|---|---|---|---|---|
| 2011/0201500 | A1* | 8/2011 | Mertoglu | A01N 25/02 |
| | | | | 504/130 |
| 2012/0122688 | A1 | 5/2012 | Wu et al. | |
| 2014/0128462 | A1* | 5/2014 | Spira | A61K 47/10 |
| | | | | 514/539 |
| 2015/0264923 | A1* | 9/2015 | Schneider | A01N 25/02 |
| | | | | 504/130 |
| 2020/0178519 | A1* | 6/2020 | LeFiles | A01N 47/18 |
| 2020/0305419 | A1* | 10/2020 | Brown | A01N 47/36 |

FOREIGN PATENT DOCUMENTS

| JP | 2003081711 A | 3/2003 | |
|---|---|---|---|
| JP | 2017155014 A | 9/2017 | |
| JP | 2020055808 A | 4/2020 | |
| WO | WO-2013083372 A1 * | 6/2013 | ............. A01N 43/56 |

OTHER PUBLICATIONS

International Search Report for PCT/US2021/031483, dated Aug. 31, 2021.

\* cited by examiner

*Primary Examiner* — Alma Pipic
(74) *Attorney, Agent, or Firm* — Barnes & Thornburg, LLP

(57) ABSTRACT

Pesticidal compositions are provided that include at least one pesticidal active ingredient and benzyl alcohol. Adjuvant compositions and associated methods are provided for use with at least one pesticidal active ingredient that include benzyl alcohol.

21 Claims, 2 Drawing Sheets

PESTICIDAL COMPOSITIONS AND RELATED METHODS

CROSS-REFERENCE TO RELATED APPLICATIONS

The present application claims priority to U.S. Provisional Application Ser. No. 62/704,411 filed May 8, 2020, the contents of which are incorporated by reference in its entirety.

BACKGROUND OF INVENTION

The control of various pests such as, for example, fungal infestations and bacterial infections continues to be a major problem in pesticidal and horticultural fields. Particularly, genetic changes in pathogenic bacteria and fungi have generated resistance to the efficacy of many types of active ingredients. Fungicide and bactericide resistance have particularly become a major challenge rendering some pesticidal compositions containing a fungicide or bactericide less efficacious against certain fungi and bacteria. In an attempt to overcome these challenges, the end-user normally adds an adjuvant to the spray mixture to improve the performance of pesticidals, however, such adjuvants may increase the cost and impact crop yield as well as the environment. Thus, there remains a need for low toxicity and crop safe adjuvant compositions that increase the efficacy of pesticidal active ingredients.

SUMMARY OF INVENTION

According to one aspect, a pesticidal composition is provided. The pesticidal composition includes at least one pesticidal active ingredient and at least one organic solvent such as benzyl alcohol, propylene carbonate, N-methylpyrrolidone, benzyl acetate, benzyl butyrate, benzyl propionate, diethyl malonate, 3-methoxy-3-methyl-1-butanol, dimethyl benzyl carbinol acetate, phenyl ethyl alcohol, terpinyl acetate, benzyl benzoate, methyl sailcylate, hexyl acetate, benzyl butyrate, diethyl malonate, ethyl acetate, phenoxy ethyl iso-butyrate, terpineol, geranyl acetate, linalyl acetate, ethyl 2-methyl butyrate, propylene glycol diacetate, dipropylene glycol monomethyl ether, and any combination thereof. According to one embodiment, the at least one organic solvent in the pesticidal compositions as provided herein is benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof. According to one embodiment, the at least one organic solvent is benzyl acetate. According to one embodiment, the at least one organic solvent is benzyl alcohol. According to one embodiment, the pesticidal composition increases the efficacy of the at least one pesticidal active ingredient compared to the at least one pesticidal active ingredient alone. According to one embodiment, the organic solvent, such as benzyl alcohol, increases the efficacy of the at least one pesticidal active ingredient by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to another embodiment, the organic solvent, such as benzyl alcohol, increases the efficacy of the at least one pesticidal active ingredient against a resistant or susceptible fungal, herbicidal, bacterial, or insect strain compared to the at least one pesticidal active ingredient alone. According to another embodiment, the organic solvent, such as benzyl alcohol, increases the efficacy of the at least one pesticidal active ingredient against a resistant or susceptible fungal, herbicidal, bacterial, or insect strain by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone.

According to one embodiment, the pesticidal composition further includes water. According to one embodiment, the water exhibits a temperature of from about 32.1° F. to about 49.9° F. According to one embodiment, the pesticidal composition further includes citric acid, potassium hydroxide, cocodimethylamine, polyoxyethylene sorbitan monolaurate, at least one emulsifier compound, at least one antifoaming compound, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one preservative, at least one plasticizer, at least one hydrophobic barrier, at least one UV protectant, at least one water soluble solvent, or any combination thereof.

According to one embodiment, the at least one pesticidal active ingredient is a bactericide, insecticide, plant growth regulator, or biopesticide. According to one embodiment, the at least one pesticidal active ingredient is a herbicide or fungicide. According to one embodiment, the at least one pesticidal active ingredient is a fungicide. According to one embodiment, the fungicide is benzimidazole carbamates, dicarboximides, demethylation inhibitors, phenyl amides, morpholines, phosphothilates, dithiolanes, carboxamides (succinate dehydrogenase inhibitors), hydroxy-(2-amino-) pyrimidines, anilino-pyrimindines, N-phenyl carbamates, quinone outside inhibitors, phenylpyrroles, quinolines, aromatic hydrocarbons, heteroaromatics, melanin biosynthesis inhibitors, hydroxyanilides, thiocarbamates, allylamines, polyoxins, phenylureas, quinone inside inhibitors, benzamides, enopyranuronic acid antibiotic, hexopyranosyl antibiotic, glucopyranosyl antibiotic, cyanoacetamide-oximes, carbamates, dinitorphenyl crotonates, pyrimindine-hydrazones, 2,6-dintiro-anilines, organo tin compounds, carboxylic acids, heteroaromatics, phosphonates, phthalamic acids, benzotriazines, benzene-sulfonamides, pyridazinones, thiophene-carboxamides, pyrimidinamides, carboxylic acid amides, tetracyline antibiotic, thiocarbamate, benzo-thiadiazole, benzisothiazole, thiadiazole-carboxamide, thiazole-carboxamides, benzamidoxime, quinazolinone, benzophenone, acylpicolide, copper, sulfur, dithicarbamates, phthalimides, chloronitriles, sulphamides, guanidines, triazines, quinones, mineral oils, organic oils, and potassium bicarbonate.

According to one embodiment, the pesticidal composition includes from about from about 1% w/w to about 70% w/w of the at least one pesticidal active ingredient, from about 2% w/w to about 93% w/w of the at least one organic solvent; and from about 2% w/w to about 80% w/w of water, citric acid, potassium hydroxide, cocodimethylamine, polyoxyethylene sorbitan monolaurate, at least one emulsifier compound, at least one antifoaming compound, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one preservative, at least one plasticizer, at least one hydrophobic barrier, at least one UV protectant, at least one water soluble solvent, or any combination thereof, citric acid, potassium hydroxide, cocodimethylamine, polyoxyethylene sorbitan monolaurate, at least one emulsifier compound, at least one antifoaming compound, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one preservative, at least one plasticizer, at least one hydrophobic barrier, at least one UV protectant, at least one water soluble solvent, or any combination thereof.

According to another aspect, a pesticidal composition is provided that is suitable for adding water just prior to use or application (referred to as an "in-can" pesticidal composition). The pesticidal composition includes at least one pesticidal active ingredient, benzyl alcohol, and one or more formulation ingredient such as a solvent, emulsifier, preservative, or antifoaming compound. The solvent may be water. Prior to use, the pesticidal composition may be later diluted with water by a factor of from about 2 to about 20. The benzyl alcohol increases the efficacy of the at least one pesticidal active ingredient compared to the at least one pesticidal active ingredient alone. The pesticidal composition does not contain water. Any water is added by the end user just prior to use. According to one embodiment, the benzyl alcohol increases the efficacy of the at least one pesticidal active ingredient by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the benzyl alcohol increases the efficacy of the at least one pesticidal active ingredient against a resistant or susceptible fungal strain by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the benzyl alcohol increases the efficacy of the at least one pesticidal active ingredient by at least about 50% compared to the at least one pesticidal active ingredient alone. According to one embodiment, the benzyl alcohol increases the efficacy of the at least one pesticidal active ingredient against a resistant or susceptible fungal strain by at least about 50% compared to the at least one pesticidal active ingredient alone. According to one embodiment, the pesticidal composition may further include citric acid, potassium hydroxide, cocodimethylamine, polyoxyethylene sorbitan monolaurate, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one plasticizer, at least one hydrophobic barrier, at least one UV protectant, at least one water soluble solvent, or any combination thereof. According to one embodiment, the at least one pesticidal active ingredient is a bactericide, insecticide, plant growth regulator, or biopesticide. According to one embodiment, the at least one pesticidal active ingredient is a herbicide or fungicide. According to one embodiment, the herbicide is N,N'-dimethyl-4,4'-bipyridinium dichloride, 3,5,6-trichloro-2-pyridinyloxyacetic acid, or methyl 2-[((4-methoxy-6-methyl-1,3,5-triazin-2-yl)carbamoylsulfamoyl]benzoate. According to one embodiment, the fungicide is one or more of a methyl benzimidazole carbamates, carboxamides (succinate dehydrogenase inhibitors), quinone outside inhibitors, demethylation inhibitors, or anilino-pyrimindines. According to one embodiment, the at least one pesticidal active ingredient is a plant growth regulator or nutritional. According to one embodiment, the pesticidal composition includes:

from about 1% w/w to about 70% w/w of the at least one pesticidal active ingredient;

from about 2% w/w to about 93% w/w benzyl alcohol; and from about 2% w/w to about 80% w/w of one or more formulation ingredient such as a solvent, emulsifier, preservative, or antifoaming compound. The pesticidal composition may optionally include a hydrocarbon-based organic solvent, n-methylpyrollidone, citric acid, potassium hydroxide, cocodimethylamine, polyoxyethylene sorbitan monolaurate, at least one emulsifier compound, at least one antifoaming compound, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one preservative, at least one plasticizer, at least one hydrophobic barrier, at least one UV protectant, at least one water soluble solvent, or any combination thereof.

According to another aspect, a pesticidal composition is provided that is ready-to-use and does not require any additional components or mixing prior to use or application. The water in the ready-to-use pesticidal composition is present in an amount such that dilution is not required prior to use. The pesticidal composition includes at least one pesticidal active ingredient; benzyl alcohol; one or more of a solvent, emulsifier, preservative, or antifoaming compound; and water. The benzyl alcohol increases the efficacy of the at least one pesticidal active ingredient compared to the at least one pesticidal active ingredient alone. According to one embodiment, the benzyl alcohol increases the efficacy of the at least one pesticidal active ingredient by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the benzyl alcohol increases the efficacy of the at least one pesticidal active ingredient against a resistant or susceptible fungal, herbicidal, bacterial, or insect strain by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the benzyl alcohol increases the efficacy of the at least one pesticidal active ingredient compared to the at least one pesticidal active ingredient alone by at least about 50%. According to one embodiment, the benzyl alcohol increases the efficacy of the at least one pesticidal active ingredient against a resistant or susceptible fungal, herbicidal, bacterial, or insect strain by at least about 50% compared to the at least one pesticidal ingredient alone. According to one embodiment, the at least one pesticidal active ingredient is a bactericide, insecticide, plant growth regulator, or biopesticide. According to one embodiment, the at least one pesticidal active ingredient is a herbicide or fungicide. According to one embodiment, the herbicide is N,N'-dimethyl-4,4'-bipyridinium dichloride, 3,5,6-trichloro-2-pyridinyloxyacetic acid, or methyl 2-[((4-methoxy-6-methyl-1,3,5-triazin-2-yl)carbamoylsulfamoyl]benzoate. According to one embodiment, the fungicide is one or more of a methyl benzimidazole carbamates, carboxamides (succinate dehydrogenase inhibitors), quinone outside inhibitors, demethylation inhibitors, or anilino-pyrimindines. According to one embodiment, the at least one pesticidal active ingredient is a plant growth regulator or nutritional. According to one embodiment, the pesticidal composition includes:

from about 0.01% w/w to about 10.0% w/w of the at least one pesticidal active ingredient;

from about 0.2% w/w to about 2.0% w/w benzyl alcohol from about 0.2% w/w to about 2.0% w/w of one or more of a solvent, emulsifier, preservative, or antifoaming compound; and from about 80.0% w/w to about 99.9 w/w of water.

According to one aspect, an adjuvant composition is provided. The adjuvant composition includes at least one (or more than one) organic solvent such as benzyl alcohol, propylene carbonate, N-methylpyrrolidone, benzyl acetate, benzyl butyrate, benzyl propionate, diethyl malonate, 3-methoxy-3-methyl-1-butanol, dimethyl benzyl carbinol acetate, phenyl ethyl alcohol, terpinyl acetate, benzyl benzoate, methyl sailcylate, hexyl acetate, benzyl butyrate, diethyl malonate, ethyl acetate, phenoxy ethyl iso-butyrate, terpineol, geranyl acetate, linalyl acetate, ethyl 2-methyl butyrate, propylene glycol diacetate, dipropylene glycol monomethyl ether, and any combination thereof. According to one embodiment, the at least one organic solvent in the adjuvant compositions as provided herein is benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof. According to one embodiment, the at least one organic solvent is benzyl acetate. According to one embodiment, the at least one organic solvent is benzyl alcohol. The adjuvant composition, when combined with at least one pesticidal active ingredient, increases the efficacy of the at least one pesticidal active ingredient compared to the at least one pesticidal active ingredient alone. According to one embodiment, the adjuvant composition, when combined with at least one pesticidal active ingredient, increases the efficacy of the at least one pesticidal active ingredient by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to another embodiment, the adjuvant composition, when combined with at least one pesticidal active ingredient, increases the efficacy of the at least one pesticidal active ingredient against a resistant or susceptible fungal, herbicidal, bacterial, or insect strain compared to the at least one pesticidal active ingredient alone. According to another embodiment, the adjuvant composition, when combined with at least one pesticidal active ingredient, increases the efficacy of the at least one pesticidal active ingredient against a resistant or susceptible fungal, herbicidal, bacterial, or insect strain by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the at least one organic solvent is benzyl acetate or benzyl alcohol.

According to one embodiment, the adjuvant composition further includes water. According to one embodiment, the water exhibits a temperature of from about 32.1° F. to about 49.9° F. According to one embodiment, the adjuvant composition further includes citric acid, potassium hydroxide, cocodimethylamine, polyoxyethylene sorbitan monolaurate, at least one emulsifier compound, at least one antifoaming compound, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one preservative, at least one plasticizer, at least one hydrophobic barrier, at least one UV protectant, at least one water soluble solvent, or any combination thereof. According to one embodiment, adjuvant includes about 0.0% w/w to about 2.0% w/w water, about 0.0% w/w to about 2.0% w/w potassium hydroxide, about 0.0% w/w to about 2.0% w/w citric acid, about 0.0% w/w to about 2.0% w/w cocodimethylamine, about 20% w/w to about 99% w/w of at least one organic solvent, and about 10% w/w to about 70% w/w of at least one surfactant. According to one embodiment, the at least one organic solvent is benzyl acetate, propylene carbonate, N-methylpyrrolidone, or any combination thereof. According to one embodiment, the at least one surfactant is cocodimethylamine, polyoxyethylene sorbitan monolaurate. According to one embodiment, the at least one pesticidal active ingredient is a bactericide, insecticide, plant growth regulator, or biopesticide. According to one embodiment, the at least one pesticidal active ingredient is a herbicide or fungicide. According to one embodiment, the at least one pesticidal active ingredient is a fungicide. According to one aspect, an adjuvant composition may include an additional adjuvant compound that is commonly accepted as performing as an adjuvant.

According to another aspect an adjuvant composition is provided. The adjuvant composition includes benzyl alcohol. The adjuvant composition, when combined with at least one pesticidal active ingredient, increases the efficacy of the at least one pesticidal active ingredient compared to the at least one pesticidal active ingredient alone. According to such an embodiment, the adjuvant composition, when combined with at least one pesticidal active ingredient, increases the efficacy of the at least one pesticidal active ingredient against a resistant or susceptible fungal, herbicidal, bacterial, or insect strain. According to one embodiment, the benzyl alcohol increases the efficacy of the at least one pesticidal active ingredient by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the benzyl alcohol increases the efficacy of the at least one pesticidal active ingredient against a resistant or susceptible fungal, herbicidal, bacterial, or insect strain by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the benzyl alcohol increases the efficacy of the at least one pesticidal active ingredient compared to the at least one pesticidal active ingredient alone by at least about 50%. According to one embodiment, the benzyl alcohol increases the efficacy of the at least one pesticidal active ingredient against a resistant or susceptible fungal, herbicidal, bacterial, or insect strain by at least about 50% compared to the at least one pesticidal ingredient alone. According to one embodiment, the at least one pesticidal active ingredient is a bactericide, insecticide, plant growth regulator, or biopesticide. According to one embodiment, the at least one pesticidal active ingredient is a herbicide or fungicide. According to one embodiment, the herbicide is N,N'-dimethyl-4,4'-bipyridinium dichloride, 3,5,6-trichloro-2-pyridinyloxyacetic acid, or methyl 2-[((4-methoxy-6-methyl-1,3,5-triazin-2-yl)carbamoylsulfamoyl] benzoate. According to one embodiment, the fungicide is one or more of a methyl benzimidazole carbamates, carboxamides (succinate dehydrogenase inhibitors), quinone outside inhibitors, demethylation inhibitors, or anilino-pyrimindines. According to one embodiment, the at least one pesticidal active ingredient is a plant growth regulator or nutritional. According to one aspect, an adjuvant composition may include an additional adjuvant compound that is commonly accepted as performing as an adjuvant.

According to another aspect, a method of producing an adjuvant composition is provided. The method includes the step of introducing at least one organic solvent to a container. The at least one organic solvent includes benzyl alcohol, propylene carbonate, N-methylpyrrolidone, benzyl acetate, benzyl butyrate, benzyl propionate, diethyl malonate, 3-methoxy-3-methyl-1-butanol, dimethyl benzyl carbinol acetate, phenyl ethyl alcohol, terpinyl acetate, benzyl benzoate, methyl sailcylate, hexyl acetate, benzyl butyrate, diethyl malonate, ethyl acetate, phenoxy ethyl iso-butyrate, terpineol, geranyl acetate, linalyl acetate, ethyl 2-methyl butyrate, propylene glycol diacetate, dipropylene glycol monomethyl ether, or any combination thereof. According to one embodiment, the at least one organic solvent is benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof. According to one embodiment, the at least one organic solvent is benzyl acetate. According to one embodiment, the at least one organic solvent is benzyl alcohol. The method may further include the step of introducing at least one additional component to the container, wherein the at least one additional component is water, citric acid, potassium hydroxide, cocodimethylamine, polyoxyethylene sorbitan monolaurate, at least one emulsifier compound, at least one antifoaming compound, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one preservative, at least one plasticizer, at least one hydrophobic barrier, at least one UV protectant, at least one water soluble solvent, or any combination thereof. The method may further include the step of attaching at least one set of instructions to the container. The at least one organic solvent is introduced to the container in an amount such that the entire container contents may be added directly to a spray tank comprising at least one pesticidal active ingredient for form a tank mix pesticidal composition. According to one embodiment, the at least one organic solvent is benzyl acetate. According to one embodiment, the at least one organic solvent is benzyl alcohol. According to one embodiment, the adjuvant composition increases the efficacy of the at least one pesticidal active ingredient by at least about 25% compared to the at least one pesticidal active ingredient alone. According to one embodiment, the at least one pesticidal active ingredient is a bactericide, insecticide, plant growth regulator, or biopesticide. According to one embodiment, the at least one pesticidal active ingredient is a herbicide or fungicide. According to another embodiment, the adjuvant composition, when combined with at least one pesticidal active ingredient, increases the efficacy of the at least one pesticidal active ingredient against a resistant or susceptible fungal, herbicidal, bacterial, or insect strain compared to the at least one pesticidal active ingredient alone According to one aspect, a tank mix pesticidal composition is provided. The tank mix pesticidal composition includes at least one pesticidal active ingredient, at least one organic solvent, and water, spray oil, or a combination of water and spray oil. The at least one organic solvent is benzyl alcohol, propylene carbonate, N-methylpyrrolidone, benzyl acetate, benzyl butyrate, benzyl propionate, diethyl malonate, 3-methoxy-3-methyl-1-butanol, dimethyl benzyl carbinol acetate, phenyl ethyl alcohol, terpinyl acetate, benzyl benzoate, methyl sailcylate, hexyl acetate, benzyl butyrate, diethyl malonate, ethyl acetate, phenoxy ethyl iso-butyrate, terpineol, geranyl acetate, linalyl acetate, ethyl 2-methyl butyrate, propylene glycol diacetate, dipropylene glycol monomethyl ether, or any combination thereof. According to one embodiment, the at least one organic solvent in the tank mix as provided herein is benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof. According to one embodiment, the at least one organic solvent is benzyl acetate. According to one embodiment, the at least one organic solvent is benzyl alcohol. According to one embodiment, the tank mix includes from about 0.01% w/w to about 10% w/w of at least one pesticidal active ingredient; from about 0.2% w/w to about 2 w/w % of at least one organic solvent; and from about 80% w/w to about 99% of water, spray oil, or a combination of water and spray oil. The tank mix may also include from about 0.2% w/w to about 2.0% w/w of one or more of a solvent, emulsifier, preservative, or antifoaming compound. According to one embodiment, the water exhibits a temperature of from about 32.1° F. to about 49.9° F. According to one embodiment, the at least one pesticidal active ingredient is a bactericide, insecticide, plant growth regulator, or biopesticide. According to one embodiment, the at least one pesticidal active ingredient is a herbicide or fungicide. According to one embodiment, the organic solvent is benzyl acetate. The tank mix pesticidal composition increases the efficacy of the at least one pesticidal active ingredient compared to the at least one pesticidal active ingredient alone. According to one embodiment, the tank mix pesticidal composition increases the efficacy of the at least one pesticidal active ingredient by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to another embodiment, the tank mix pesticidal composition increases the efficacy of the at least one pesticidal active ingredient against a resistant or susceptible fungal strain compared to the at least one pesticidal active ingredient alone. According to another embodiment, the tank mix pesticidal composition increases the efficacy of the at least one pesticidal active ingredient against a resistant or susceptible fungal strain by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone.

According to one aspect, an adjuvant composition for increasing the efficacy of a fungicidal active ingredient is provided. The adjuvant composition increases the efficacy of any fungicidal or bactericide active ingredient as provided in one or more FRAC Groups. According to one embodiment, the adjuvant composition increases efficacy against fungicidal resistant strains of fungi. According to one embodiment, the adjuvant composition increases efficacy against fungicidal susceptible strains of fungi. According to one embodiment, the adjuvant composition includes at least one organic solvent is benzyl alcohol, propylene carbonate, N-methylpyrrolidone, benzyl acetate, benzyl butyrate, benzyl propionate, diethyl malonate, 3-methoxy-3-methyl-1-butanol, dimethyl benzyl carbinol acetate, phenyl ethyl alcohol, terpinyl acetate, benzyl benzoate, methyl sailcylate, hexyl acetate, benzyl butyrate, diethyl malonate, ethyl acetate, phenoxy ethyl iso-butyrate, terpineol, geranyl acetate, linalyl acetate, ethyl 2-methyl butyrate, propylene glycol diacetate, dipropylene glycol monomethyl ether, or any combination thereof. According to one embodiment, the adjuvant composition includes at least one benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof. According to one embodiment, the at least one organic solvent is benzyl acetate. According to one embodiment, the at least one organic solvent is benzyl alcohol. The adjuvant composition, when combined with at least one fungicidal or bactericide active ingredient, increases the efficacy of the at least one fungicidal or bactericide active ingredient against fungicidal or bactericide resistant or susceptible strains compared to the at least one fungicidal or bactericide active ingredient alone. According to one embodiment, the fungicidal or bactericide active ingredient is selected from the group consisting of methyl benzimidazole carbamates, succinate dehydrogenase inhibitors, quinone outside inhibitors, demethylation inhibitors, and anilino-pyrimindines. According to one embodiment, the fungicidal or bactericide active ingredient falls within one or more of the FRAC groups that include Groups 1-15, 16.1, 16.2, 17-42, P, U, M, and NC. According to one embodiment, the fungicidal or bactericide active ingredient includes methyl benzimidazole carbamates, dicarboximides, demethylation inhibitors, phenyl amides, morpholines, phosphothilates, dithiolanes, carboxamides (succinate dehydrogenase inhibitors), hydroxy-(2-amino-)pyrimidines, anilino-pyrimindines, N-phenyl carbamates, quinone outside inhibitors, phenylpyrroles, quinolines, aromatic hydrocarbons, heteroaromatics, melanin biosynthesis inhibitors, hydroxyanilides, thiocarbamates, allylamines, polyoxins, phenylureas, quinone inside inhibitors, benzamides, enopyranuronic acid antibiotic, hexopyranosyl antibiotic, glucopyranosyl antibiotic, cyanoacetamide-oximes, carbamates, dinitorphenyl crotonates, pyrimindine-hydrazones, 2,6-dintiro-anilines, organo tin compounds, carboxylic acids, heteroaromatics, phosphonates, phthalamic acids, benzotri-azines, benzene-sulfonamides, pyridazinones, thiophene-carboxamides, pyrimidinamides, carboxylic acid amides, tetracyline antibiotic, thiocarbamate, benzo-thiadiazole, benzisothiazole, thiadiazole-carboxamide, thiazole-carboxamides, benzamidoxime, quinazolinone, benzophenone, acylpicolide, copper, sulfur, dithicarbamates, phthalimides, chloronitriles, sulphamides, guanidines, triazines, quinones, mineral oils, organic oils, and potassium bicarbonate. According to one embodiment, the adjuvant includes about 0.0% w/w to about 2.0% w/w water; about 0.0% w/w to about 2.0% w/w potassium hydroxide; about 0.0% w/w to about 2.0% w/w citric acid; about 0.0% w/w to about 2.0% w/w cocodimethylamine; about 20% w/w to about 99% w/w of at least one organic solvent; and about 10% w/w to about 70% w/w of at least one surfactant.

According to another embodiment, the adjuvant composition, when combined with at least one fungicidal active ingredient, increases the efficacy of the at least one fungicidal active ingredient against a resistant or susceptible fungal, herbicidal, bacterial, or insect strain compared to the at least one fungicidal active ingredient alone. According to another embodiment, the adjuvant composition, when combined with at least one fungicidal active ingredient, increases the efficacy of the at least one fungicidal active ingredient against a resistant or susceptible fungal, herbicidal, bacterial, or insect strain by at least about 5%, 10%, 15%, 20% 25%, 30%, 35%, 40%, 45%, 50%, 55%, 60%, 65%, 70%, 75%, 80%, 85%, 90%, 95% compared to the at least one fungicidal active ingredient alone.

According to another aspect, an adjuvant composition for increasing the efficacy of a bactericide active ingredient is provided. The adjuvant composition includes at least one organic solvent selected from the group consisting of benzyl alcohol, benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, diethyl malonate, or any combination thereof. According to one embodiment, the at least one organic solvent is benzyl acetate. According to one embodiment, the at least one organic solvent is benzyl alcohol. The adjuvant composition, when combined with at least one bactericide active ingredient, increases the efficacy of the at least one bactericide active ingredient compared to the at least one bactericide active ingredient alone. According to another embodiment, the adjuvant composition, when combined with at least one bactericide active ingredient, increases the efficacy of the at least one bactericide active ingredient against a resistant or susceptible bacterial strain by at least about 5%, 10%, 15%, 20% 25%, 30%, 35%, 40%, 45%, 50%, 55%, 60%, 65%, 70%, 75%, 80%, 85%, 90%, 95% compared to the at least one bactericide active ingredient alone. According to one embodiment, the at least one bactericide active ingredient includes phthalimide and dithiocarbamate and the at least one organic solvent is diethyl malonate.

According to another aspect, a method of increasing the efficacy of at least one pesticidal active ingredient is provided. The method includes introducing an effective amount of benzyl alcohol to at least one pesticidal active ingredient. Such a step may be carried out by mixing the effective amount of benzyl alcohol with the at least one pesticidal active ingredient. The method increases the efficacy of the at least one pesticidal active ingredient against a resistant or susceptible fungal, herbicidal, bacterial, or insect strain by at least about 5%, 10%, 15%, 20% 25%, 30%, 35%, 40%, 45%, 50%, 55%, 60%, 65%, 70%, 75%, 80%, 85%, 90%, 95% compared to the at least one fungicidal active ingredient alone. According to one embodiment, the benzyl alcohol increases the efficacy of the at least one pesticidal active ingredient by at least about 50% compared to the at least one pesticidal active ingredient alone. According to one embodiment, the benzyl alcohol increases the efficacy of the at least one pesticidal active ingredient against a resistant or susceptible fungal strain by at least about 50% compared to the at least one pesticidal active ingredient alone. The method of increasing the efficacy of at least one pesticidal active ingredient may further include introducing one or more of a solvent, emulsifier, preservative, water, or antifoaming compound. According to an alternative embodiment, the method of increasing the efficacy of at least one pesticidal active ingredient may further include introducing one or more of a solvent, emulsifier, preservative, or antifoaming compound but not water.

DETAILED DESCRIPTION

Figure 1:
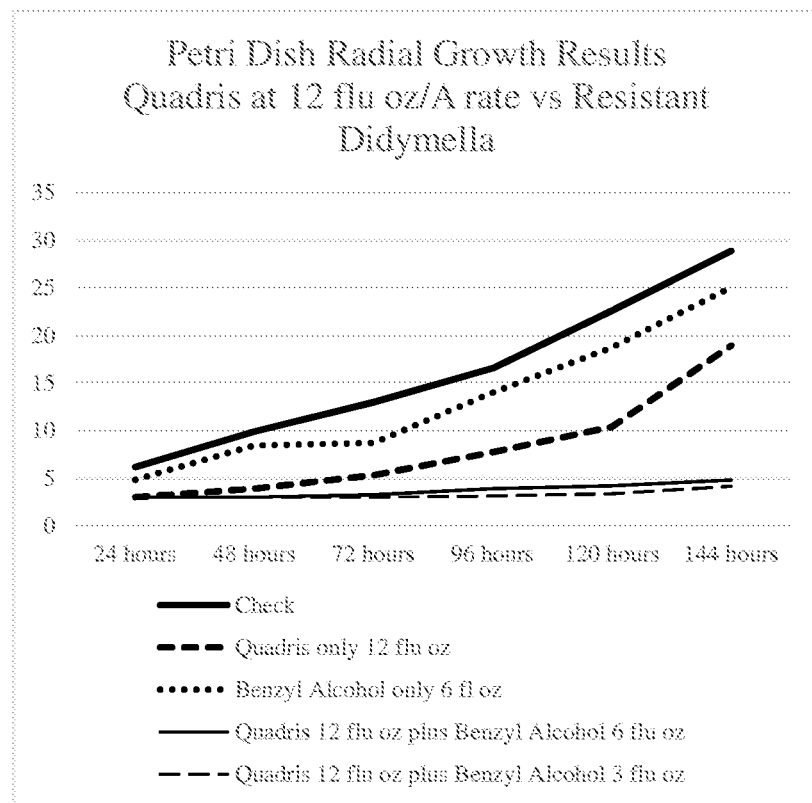
FIG. 1 illustrates a line graph of petri dish radial growth results utilizing Quadris at a rate of 12 fluid ounces per acre versus resistant Didymella.
Figure 2:
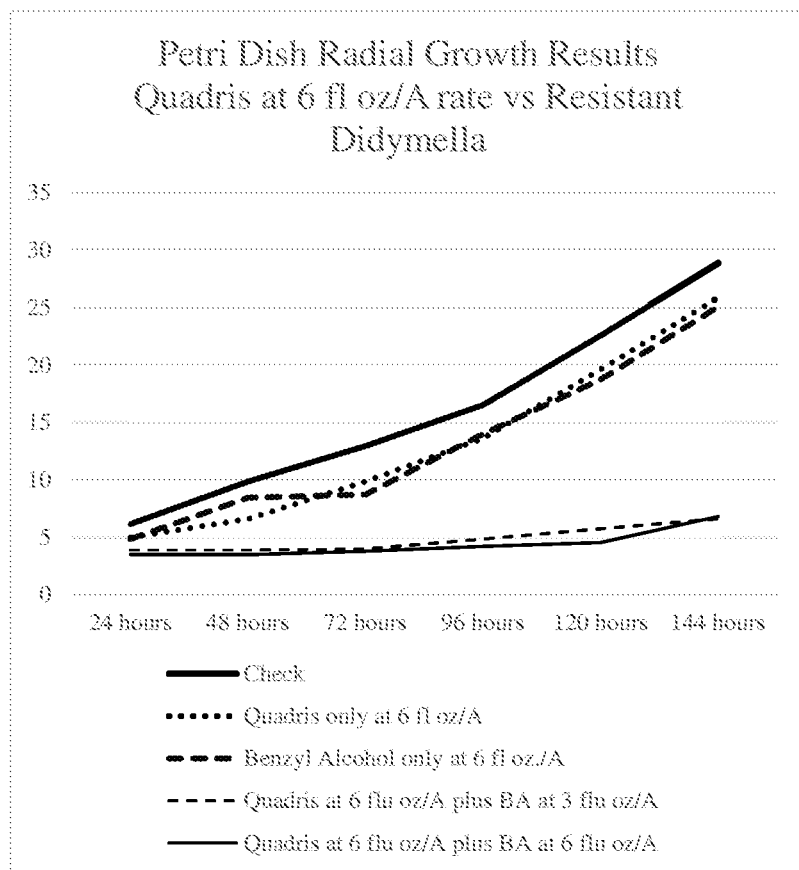
FIG. 2 illustrates a line graph of petri dish radial growth results utilizing Quadris at a rate of 6 fluid ounces per acre versus resistant Didymella.

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the present disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

As used herein, the term "adjuvant" refers to one or more organic solvents that improve the desired performance of a pesticidal active ingredient.

As used herein, the term "pesticide" or "pesticidal" refers to crop use, turf use, ornamental use, homeowner use or any acceptable use where elimination of a pest is suitable.

As used herein, the term "benzyl alcohol" refers to CAS 100-51-6 and may be referred to as benzenemethanol.

As used herein, the term "FRAC" refers to the fungicide resistance action committee.

As used herein, the term "FRAC Group" refers to groups of a list of groups of fungicides and bactericides according to their mode of action and resistance risk. The FRAC groups are widely accepted in literature and incorporated herein by reference. The FRAC groups include Groups 1-15, 16.1, 16.2, 17-42, P, U, M, and NC. The FRAC groups include methyl benzimidazole carbamates, dicarboximides, demethylation inhibitors, phenyl amides, morpholines, phosphothilates, dithiolanes, carboxamides (succinate dehydrogenase inhibitors), hydroxy-(2-amino-)pyrimidines, anilino-pyrimindines, N-phenyl carbamates, quinone outside inhibitors, phenylpyrroles, quinolines, aromatic hydrocarbons, heteroaromatics, melanin biosynthesis inhibitors, hydroxyanilides, thiocarbamates, allylamines, polyoxins, phenylureas, quinone inside inhibitors, benzamides, enopyranuronic acid antibiotic, hexopyranosyl antibiotic, glucopyranosyl antibiotic, cyanoacetamide-oximes, carbamates, dinitorphenyl crotonates, pyrimindine-hydrazones, 2,6-dintiro-anilines, organo tin compounds, carboxylic acids, heteroaromatics, phosphonates, phthalamic acids, benzotriazines, benzene-sulfonamides, pyridazinones, thiophene-carboxamides, pyrimidinamides, carboxylic acid amides, tetracyline antibiotic, thiocarbamate, benzo-thiadiazole, benzisothiazole, thiadiazole-carboxamide, thiazole-carboxamides, benzamidoxime, quinazolinone, benzophenone, acylpicolide, copper, sulfur, dithicarbamates, phthalimides, chloronitriles, sulphamides, guanidines, triazines, quinones, mineral oils, organic oils, and potassium bicarbonate.

As used herein, the term "nutritional" refers to one or more minerals or micronutrients required by a plant for growth and productivity.

Pesticidal compositions for improving the desired performance of a pesticidal active ingredient are provided. The pesticidal compositions described herein include at least one organic solvent, at least one active ingredient and, optionally, one or more additional components as provided herein.

According to one embodiment, the pesticidal compositions as provided herein are formulated as an emulsifiable concentrate formulation, aqueous suspension concentrate (suspension concentrate), emulsion in water formulation, dry flowable, water dispersible granule, wettable powder, soluble powder, oil dispersion, or concentrated aqueous solution. According to one embodiment, the pesticidal compositions as provided herein are formulated as ready-to-use, tank mixes, or in-can compositions. The in-can pesticidal compositions as provided herein may be added to a spray tank such that a stable tank mix pesticidal composition (i.e., spray tank mixture) is formed when the in-can pesticidal composition and any other additional optional ingredients, such as water or spray oil, are combined in the spray tank. According to one embodiment, the pesticidal compositions as provided herein are formulated to have a pH of from about 5.0 to about 10.0. According to one embodiment, such a pesticidal composition is diluted with water by a factor of from about 2 to about 20 prior to use.

An organic solvent as provided herein is preferably not phytotoxic, approved for crop use by the Environmental Protection Agency (EPA) and safe for end user mixing. Suitable organic solvents include, but are not limited to, organic compounds within the chemical classes of carbonates, ester compounds, amide compounds, ketone compounds, and alcohol compounds. According to a particular embodiment, the organic solvent is benzyl alcohol, propylene carbonate, N-methylpyrrolidone, benzyl acetate, benzyl butyrate, benzyl propionate, diethyl malonate, 3-methoxy-3-methyl-1-butanol, dimethyl benzyl carbinol acetate, phenyl ethyl alcohol, terpinyl acetate, benzyl benzoate, methyl sailcylate, hexyl acetate, benzyl butyrate, diethyl malonate, ethyl acetate, phenoxy ethyl iso-butyrate, terpineol, geranyl acetate, linalyl acetate, ethyl 2-methyl butyrate, propylene glycol diacetate, dipropylene glycol monomethyl ether, or any combination thereof.

According to a particular embodiment, the at least one organic solvent is benzyl alcohol. The benzyl alcohol as provided herein may be commercially available from various sources such as, for example, Sigma Aldrich.

According to another particular embodiment, the at least one organic solvent provided herein is benzyl acetate. The benzyl acetate as provided herein may be commercially available from various sources such as, for example, Sigma Aldrich. The benzyl acetate as provided herein may also be derived from a natural source such as, for example, essential oils. Suitable essential oil sources include, but are not limited to, jasmine oil, ylang ylan oil, neroli oil, or any combination thereof.

According to a particular embodiment, the organic solvent is propylene carbonate. According to another particular embodiment, the organic solvent is N-methylpyrrolidone. According to one embodiment, the organic solvent is benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof.

Other suitable organic solvents include, but are not limited to, acetate esters such as, for example, n-butyl acetate, iso-butyl acetate, n-pentyl acetate, iso-pentyl acetate, n-hexyl acetate, iso-hexyl acetate, cyclohexyl acetate, phenyl acetate, n-heptyl acetate, iso-heptyl acetate, cyclohexylmethyl acetate, benzyl alcohol, benzyl acetate, benzyl salicylate, toluene, xylene, petroleum ether, vegetable oils, acetone, methyl ethyl ketone, cyclohexanone, acid anhydrides, acetonitrile, acetophenone, amyl acetate, 2-butanone, butylenes carbonate, 1,2-butylene carbonate, diethylene glycol butyl ether, diethylene glycol butyl ether acetate, dibasic ester mixture, dimethyl sulfoxide, dipropylene glycol methyl ether, ethylene glycol butyl ether, ethylene carbonate, 3-ethoxy ethyl proprionate, ethylene glycol diacetate, furfuryl alcohol, gamma-butyrolactone, methyl ethyl ketone, methyl isoamyl ketone, n-amy acetate, n-methyl-2-pyrroline, propylene glycol butyl ether, propylene carbonate, propylene, glycol methyl ether, propylene glycol methyl ether acetate, triethylene glycol, glycol diether, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, 2-ethyl hexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol (PEG 400), propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, amyl alcohol, tetrahydrofurfuryl alcohol, hexanol, octanol, ethylene glycol, propylene glycol, glycerol, N-methyl-2-pyrrolidone, glycerol, pentaerythritol, dimethyl sulfoxide, dimethyl formamide, glymes, acetone, Atlox™ 4915, Atlox™ PN-100, Zephrym™ PD3315, any of the Tween™ L Series compounds, and combinations thereof.

According to another aspect an adjuvant composition is provided. The adjuvant composition includes benzyl alcohol. The adjuvant composition, when combined with at least one pesticidal active ingredient, increases the efficacy of the at least one pesticidal active ingredient compared to the at least one pesticidal active ingredient alone. According to such an embodiment, the adjuvant composition, when combined with at least one pesticidal active ingredient, increases the efficacy of the at least one pesticidal active ingredient against a resistant or susceptible fungal, herbicidal, bacterial, or insect strain. According to one embodiment, the benzyl alcohol increases the efficacy of the at least one pesticidal active ingredient by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the benzyl alcohol increases the efficacy of the at least one pesticidal active ingredient against a resistant or susceptible fungal, herbicidal, bacterial, or insect strain by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the benzyl alcohol increases the efficacy of the at least one pesticidal active ingredient compared to the at least one pesticidal active ingredient alone by at least about 50%. According to one embodiment, the benzyl alcohol increases the efficacy of the at least one pesticidal active ingredient against a resistant or susceptible fungal, herbicidal, bacterial, or insect strain by at least about 50% compared to the at least one pesticidal ingredient alone. According to one embodiment, the at least one pesticidal active ingredient is a bactericide, insecticide, plant growth regulator, or biopesticide. According to one embodiment, the at least one pesticidal active ingredient is a herbicide or fungicide. According to one embodiment, the herbicide is N,N'-dimethyl-4,4'-bipyridinium dichloride, 3,5,6-trichloro-2-pyridinyloxyacetic acid, or methyl 2-[((4-methoxy-6-methyl-1,3,5-triazin-2-yl)carbamoylsulfamoyl] benzoate. According to one embodiment, the fungicide is one or more of a methyl benzimidazole carbamates, carboxamides (succinate dehydrogenase inhibitors), quinone outside inhibitors, demethylation inhibitors, or anilino-pyrimidines. According to one embodiment, the at least one pesticidal active ingredient is a plant growth regulator or nutritional.

According to another aspect, a pesticidal composition is provided that is suitable for adding water (and/or spray oil) just prior to use or application (referred to as an "in-can" pesticidal composition). The pesticidal composition includes at least one pesticidal active ingredient, benzyl alcohol, and one or more formulation ingredient such as a solvent, emulsifier, preservative, or antifoaming compound. The solvent may be water. The benzyl alcohol increases the efficacy of the at least one pesticidal active ingredient compared to the at least one pesticidal active ingredient alone. The pesticidal composition does not contain water. Any water is added by the end user just prior to use. According to one embodiment, the benzyl alcohol increases the efficacy of the at least one pesticidal active ingredient by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the benzyl alcohol increases the efficacy of the at least one pesticidal active ingredient against a resistant or susceptible fungal strain by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the benzyl alcohol increases the efficacy of the at least one pesticidal active ingredient by at least about 50% compared to the at least one pesticidal active ingredient alone. According to one embodiment, the benzyl alcohol increases the efficacy of the at least one pesticidal active ingredient against a resistant or susceptible fungal strain by at least about 50% compared to the at least one pesticidal active ingredient alone. According to one embodiment, the pesticidal composition may further include citric acid, potassium hydroxide, cocodimethylamine, polyoxyethylene sorbitan monolaurate, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one plasticizer, at least one hydrophobic barrier, at least one UV protectant, at least one water soluble solvent, or any combination thereof. According to one embodiment, the at least one pesticidal active ingredient is a bactericide, insecticide, plant growth regulator, or biopesticide. According to one embodiment, the at least one pesticidal active ingredient is a herbicide or fungicide. According to one embodiment, the herbicide is N,N'-dimethyl-4,4'-bipyridinium dichloride, 3,5,6-trichloro-2-pyridinyloxyacetic acid, or methyl 2-[((4-methoxy-6-methyl-1,3,5-triazin-2-yl)carbamoylsulfamoyl]benzoate. According to one embodiment, the fungicide is one or more of a methyl benzimidazole carbamates, carboxamides (succinate dehydrogenase inhibitors), quinone outside inhibitors, demethylation inhibitors, or anilino-pyrimindines. According to one embodiment, the at least one pesticidal active ingredient is a plant growth regulator or nutritional. According to one embodiment, the in-can pesticidal composition includes:

from about 1% w/w to about 70% w/w of the at least one pesticidal active ingredient;

from about 2% w/w to about 93% w/w benzyl alcohol; and from about 2% w/w to about 80% w/w of one or more formulation ingredient such as a solvent, emulsifier, preservative, or antifoaming compound. The solvent may be water. According to one embodiment, such a pesticidal composition is diluted with water by a factor of from about 2 to about 20 prior to use. The pesticidal composition optionally includes at least one additional component such as hydrocarbon-based organic solvent, n-methylpyrollidone, citric acid, potassium hydroxide, cocodimethylamine, polyoxyethylene sorbitan monolaurate, at least one emulsifier compound, at least one antifoaming compound, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one preservative, at least one plasticizer, at least one hydrophobic barrier, at least one UV protectant, at least one water soluble solvent, or any combination thereof. According to one embodiment, the in-can pesticidal composition includes from about 10% w/w to about 30% w/w of the at least one pesticidal active ingredient. According to one embodiment, the in-can pesticidal composition includes about 20% w/w of the at least one pesticidal active ingredient. According to one embodiment, the in-can pesticidal composition includes from about 20% w/w to about 60% w/w benzyl alcohol. According to one embodiment, the in-can pesticidal composition includes from about 30% w/w to about 50% w/w benzyl alcohol. According to one embodiment, the in-can pesticidal composition includes about 40% w/w benzyl alcohol. According to one embodiment, the in-can pesticidal composition includes from about 30% w/w to about 60% w/w of the at least one additional component. According to one embodiment, the in-can pesticidal composition includes from about 40% w/w to about 50% w/w of the at least one additional component. According to one embodiment, the in-can pesticidal composition includes from about 45% w/w of the at least one additional component.

According to another aspect, a pesticidal composition is provided that is ready-to-use and does not require any additional components or mixing prior to use or application. The pesticidal composition includes at least one pesticidal active ingredient; benzyl alcohol; one or more of a solvent, emulsifier, preservative, or antifoaming compound; and water. The water in the ready-to-use pesticidal composition is present in an amount such that dilution is not required prior to use. The benzyl alcohol increases the efficacy of the at least one pesticidal active ingredient compared to the at least one pesticidal active ingredient alone. According to one embodiment, the benzyl alcohol increases the efficacy of the at least one pesticidal active ingredient by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the benzyl alcohol increases the efficacy of the at least one pesticidal active ingredient against a resistant or susceptible fungal, herbicidal, bacterial, or insect strain by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the benzyl alcohol increases the efficacy of the at least one pesticidal active ingredient compared to the at least one pesticidal active ingredient alone by at least about 50%. According to one embodiment, the benzyl alcohol increases the efficacy of the at least one pesticidal active ingredient against a resistant or susceptible fungal, herbicidal, bacterial, or insect strain by at least about 50% compared to the at least one pesticidal ingredient alone. According to one embodiment, the at least one pesticidal active ingredient is a bactericide, insecticide, plant growth regulator, or biopesticide. According to one embodiment, the at least one pesticidal active ingredient is a herbicide or fungicide. According to one embodiment, the herbicide is N,N'-dimethyl-4,4'-bipyridinium dichloride, 3,5,6-trichloro-2-pyridinyloxyacetic acid, or methyl 2-[((4-methoxy-6-methyl-1,3,5-triazin-2-yl)carbamoylsulfamoyl]benzoate. According to one embodiment, the fungicide is one or more of a methyl benzimidazole carbamates, carboxamides (succinate dehydrogenase inhibitors), quinone outside inhibitors, demethylation inhibitors, or anilino-pyrimindines. According to one embodiment, the at least one pesticidal active ingredient is a plant growth regulator or nutritional. According to one embodiment, the ready-to-use pesticidal composition includes:

from about 0.01% w/w to about 10.0% w/w of the at least one pesticidal active ingredient;

from about 0.2% w/w to about 2.0% w/w benzyl alcohol from about 0.2% w/w to about 2.0% w/w of at least one additional component such as one or more of a solvent, emulsifier, preservative, or antifoaming compound; and from about 80.0% w/w to about 99.9 w/w of water.

According to one embodiment, the ready-to-use pesticidal compositions as provided herein include typically at least from about 0.1% w/w to about 10% by weight (w/w) of benzyl alcohol. According to one embodiment, the ready-to-use pesticidal compositions as provided herein include typically at least from about 0.2% w/w to about 5% by weight (w/w) of benzyl alcohol. According to one embodiment, the ready-to-use pesticidal compositions as provided herein include typically at least from about 0.3% w/w to about 2.5% by weight (w/w) of benzyl alcohol. According to one embodiment, the ready-to-use pesticidal compositions as provided herein include typically at least from about 0.4% w/w to about 1.0% by weight (w/w) of benzyl alcohol. According to one embodiment, the ready-to-use pesticidal compositions as provided herein include typically about 0.5% w/w of benzyl alcohol.

According to one embodiment, the ready-to-use pesticidal compositions as provided herein include typically at least from about 0.1% w/w to about 10% w/w of the at least one pesticidal active ingredient as provided herein. According to one embodiment, the ready-to-use pesticidal compositions as provided herein include typically at least from about 0.5% w/w to about 5% w/w of the at least one pesticidal active ingredient. According to one embodiment, the ready-to-use pesticidal compositions as provided herein include typically at least from about 0.75% w/w to about 1.25% w/w of the at least one pesticidal active ingredient. According to one embodiment, the ready-to-use pesticidal compositions as provided herein include typically at about 1.0% w/w of the at least one pesticidal active ingredient.

According to one embodiment, the ready-to-use pesticidal compositions as provided herein include typically at least from about 0.1% w/w to about 10% w/w of the at least one additional component. According to one embodiment, the ready-to-use pesticidal compositions as provided herein include typically at least from about 0.5% w/w to about 5% w/w of the at least one additional component. According to one embodiment, the ready-to-use pesticidal compositions as provided herein include typically at least from about 0.75% w/w to about 1.25% w/w of the at least one additional component. According to one embodiment, the ready-to-use pesticidal compositions as provided herein include typically at about 1.0% w/w of the at least one additional component.

According to one embodiment, the ready-to-use pesticidal compositions as provided herein include typically at least from about 80.0% w/w to about 99.9% w/w water. According to one embodiment, the ready-to-use pesticidal compositions as provided herein include typically at least from about 90.0% w/w to about 99.0% w/w water. According to one embodiment, the ready-to-use pesticidal compositions as provided herein include typically at least from about 95.0% w/w to about 98% w/w water. According to one embodiment, the ready-to-use pesticidal compositions as provided herein include typically at about 97.5% w/w water.

As provided herein, a pesticidal active ingredient is a fungicide, bactericide, herbicide, insecticide, pesticide, biopesticide, plant growth regulator or any combination thereof. The at least one pesticidal active ingredient may be any active ingredient approved by the Environmental Protection Agency and registered under the Federal Insecticide, Fungicide, and Rodenticide Act (FIFRA). The pesticidal active ingredient may be a solid or liquid.

According to one embodiment, the at least one pesticidal active ingredient is a fungicide or bactericide. According to one embodiment, the fungicide or bactericide is a FRAC Group 1-15, 16.1, 16.2, 17-42, P, U, M, or NC fungicide. The FRAC groups include methyl benzimidazole carbamates, dicarboximides, demethylation inhibitors, phenyl amides, morpholines, phosphothilates, dithiolanes, carboxamides (succinate dehydrogenase inhibitors), hydroxy-(2-amino-)pyrimidines, anilino-pyrimindines, N-phenyl carbamates, quinone outside inhibitors, phenylpyrroles, quinolines, aromatic hydrocarbons, heteroaromatics, melanin biosynthesis inhibitors, hydroxyanilides, thiocarbamates, allylamines, polyoxins, phenylureas, quinone inside inhibitors, benzamides, enopyranuronic acid antibiotic, hexopyranosyl antibiotic, glucopyranosyl antibiotic, cyanoacetamide-oximes, carbamates, dinitorphenyl crotonates, pyrimindine-hydrazones, 2,6-dintiro-anilines, organo tin compounds, carboxylic acids, heteroaromatics, phosphonates, phthalamic acids, benzotriazines, benzene-sulfonamides, pyridazinones, thiophene-carboxamides, pyrimidinamides, carboxylic acid amides, tetracyline antibiotic, thiocarbamate, benzo-thiadiazole, benzisothiazole, thiadiazole-carboxamide, thiazole-carboxamides, benzamidoxime, quinazolinone, benzophenone, acylpicolide, copper, sulfur, dithicarbamates, phthalimides, chloronitriles, sulphamides, guanidines, triazines, quinones, mineral oils, organic oils, and potassium bicarbonate.

According to one embodiment, the fungicide is within the family of strobilurin fungicides. The strobilurin fungicides as provided herein include all fungicides within FRAC Group 11. According to a particular embodiment, the at least one pesticidal active ingredient is a fungicide such as, for example, azoxystrobin (methyl (2E)-2-(2-{[6-(2-cyanophenoxy)pyrimidin-4-yl]oxy}phenyl)-3-methoxyprop-2-enoate). According to another embodiment, the at least one pesticidal active ingredient is a fungicide such as, for example, iprodione, oxytetracycline, bifujunzhi, coumethoxystrobin, coumoxystrobin, dimoxystrobin, enestroburin, enoxastrobin, fenaminstrobin, fenoxystrobin, flufenoxystrobin, fluoxastrobin, jiaxiangjunzhi, kresoxim-methyl, mandestrobin, metominostrobin, orysastrobin, picoxystrobin, pyraclostrobin, pyrametostrobin, pyraoxystrobin, triclopyricarb, trifloxystrobin, methyl 2-[2-(2,5-dimethylphenyloxymethyl)phenyl]-3-methoxyacrylate, pyribencarb, triclopyricarb/chlorodincarb, famoxadon, fenamidon, cyazofamid, amisulbrom, benodanil, bixafen, boscalid, carboxin, fenfuram, fluopyram, flutolanil, fluxapyroxad, furametpyr, isopyrazam, mepronil, oxycarboxin, penflufen, penthiopyrad, sedaxane, tecloftalam, thifluzamide, N-(4'-trifluoromethylthio-biphenyl-2-yl)-3-difluoromethyl-1-methyl-1H-pyrazole-4-carboxamide, N-(2-(1,3,3-trimethylbutyl)phenyl)-1,3-dimethyl-5-fluoro-1H-pyrazole-4-carboxamide, N-[9-(dichloromethylene)-1,2,3,4-tetrahydro-1,4-methanonaphthalen-5-yl]-3-(difluoromethyl)-1-methyl-1H-pyrazole-4-carboxamide, diflumetorim, binapacryl, dinobuton, dinocap, meptyl-dinocap, fluazinam, ferimzone, ametoctradin, silthiofam, azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole ((RS)-1-(4-Chlorophenyl)-4,4-dimethyl-3-(1H, 1,2,4-triazol-1-ylmethyl)pentan-3-01), tetraconazole, triadimefon, triadimenol, triticonazole, uniconazole, imazalil, pefurazoate, prochloraz, triflumizole, pyrimidines, fenarimol, nuarimol, pyrifenox, triforine, aldimorph, dodemorph, dodemorph acetate, fenpropimorph, tridemorph, fenpropidin, piperalin, spiroxamine, fenhexamid, benalaxyl, benalaxyl-M, kiralaxyl, metalaxyl, metalaxyl-M (mefenoxam), ofurace, oxadixyl, hymexazole, octhilinone, oxolinic acid, bupirimate, benomyl, carbendazim, fuberidazole, thiabendazole, thiophanate-methyl, 5-chloro-7-(4-methyl-piperidin-1-yl)-6-(2,4,6-trifluorophenyl)-[1,2,4]triazolo[1,5-a]pyrimidine, diethofencarb, ethaboxam, pencycuron, fluopicolid, zoxamid, metrafenon, pyriofenon, cyprodinil, mepanipyrim, pyrimethanil, fluoroimide, iprodione, procymidone, vinclozolin, fenpiclonil, fludioxonil, quinoxyfen, edifenphos, iprobenfos, pyrazophos, isoprothiolane, dicloran, quintozene, tecnazene, tolclofos-methyl, biphenyl, chloroneb, etridiazole, dimethomorph, flumorph, mandipropamid, pyrimorph, benthiavalicarb, iprovalicarb, valifenalate and 4-fluorophenyl N-(1-(1-(4-cyanophenyl)ethanesulfonyl)but-2-yl)carbamate, propamocarb, propamocarb hydrochloride, ferbam, mancozeb, maneb, metiram, propineb, thiram, zineb, ziram, anilazine, chlorothalonil, captafol, captan, folpet, dichlofluanid, dichlorophen, flusulfamide, hexachlorobenzene, pentachlorophenol, phthalid, tolylfluanid, N-(4-chloro-2-nitrophenyl)-N-ethyl-4-methylbenzenesulfonamide, guanidine, dithianon, validamycin, polyoxin B, pyroquilon, tricyclazole, carpropamid, dicyclomet, fenoxanil, and mixtures thereof.

According to one embodiment, the at least one pesticidal active ingredient is a herbicide. Suitable herbicides include those from all of the major families of herbicide chemistry including but not limited to sulfonylurea, triazine, uracil, imidazoline, pyridine, and urea. Suitable herbicides include but are not limited to, 2,4-D, clyopyralid, dicamba, fosamine, glyphosate, imazapyr, hexazinone, imazapyr, metsulfuron methyl, pcloram, sulfometuron methyl and other sulfonylurea compounds, triclopyr, ethofumesate, bifenzate, metribuzin, fenmedipham, desmedipham, thidiazuron, diuron, quinclorac, clodinafop, fenoxaprop, tralkoxydim, prosulfocarb, triasulfuron, prosulfuron, amidosulfuron, iodosulfuron, chlorsulfuron, flupyrsulfuron, mesosulfuron, metsulfuron, sulfosulfuron, thifensulfuron, tribenuron, tritosulfuron, florasulam, metosulam, flumetsulam, pyroxsulam, dichlorprop-p, MCPA, mecoprop, mecoprop-p, MCPB, clopyralid, bromoxynil, bromoxynil-octanoate, ioxynil, ioxynil-octanoate, fluroxypyr, trifluralin, diflufenican, picolinafen, pendimethalin and triallate, tralkoxydim, triasulfuron, diflufenican, florasulam, pyroxsulam, pyroxsulam, bipyridyliums, diphenyl ethers (nitrophenyl ethers), triazines, uracils, phenylureas, nitriles, Stam (3',4'-dichloropropionanilide, DCPA) and Alachlor (2-chloro-2',6'-diethyl-N-(methoxymethyl)-acetanilide), DCMU (3-(3,4-dichlorophenyl)-1,1-dimethylurea) and Rinuron (3-(3,4-dichlorophenyl)-1-methoxy-1-methylurea), thifensulfuromnethyl(methyl-3-(4-methoxy-6-methyl-1,3,5-triazin-2-ylcarbamoylsulfamoyl)-2-tanoate), Flazesulfuron (1-(4,6-dimethoxy pyrimidin-2-yl)-3-(3-trifluoromethyl-2-pyridylsulfonyl-) urea), Paraquat dichloride (1,1'-dimethyl-4,4'-bipyridinium dichloride), Diquat dibromide (6,7-dihydrodipyride[1,2-a:2',1'c]-pyrazinediium dibromide), Bromacil (5-bromo-3-sec-butyl-6-methyluracil), Gesatop (2-chloro-4,6-bis(ethylamino)-1,3,5-triazine), Simetryn (2,4-bis(ethylamino)-6-methylthio-1,3,5-triazine), DBN (2,6-dichlorobenzonitrile-), Trifluralin (alpha,alpha,alpha-trifluoro-2,6-dinitro-N,N-dipropyl-p-toluidine), Thiobencarb (Saturn) (S-p-chlorobenzyl diethylthiocarbamate), MCC (methyl-3,4-dichlorocarbe-nylate, NIP (2,4-dichlorophenyl-p-nitro-phenyl ether), PCP (sodium pentachlorophenoxide), MDBA (3,6-dichloro-2-methoxybenzoic acid dimethylamine salt), 2,4-D sodium salt (sodium 2,4-dichlorophenoxyacetate), 2,4 D Esters, Mapica ([4-chloro-o-toluyl)oxy]aceto-o-chloroanilide, Bialaphos (sodium salt of L-2-amino-4-[(hydroxy(methyl)phosphinoyl]-butylyl-alanyl-N-alanine), Glufosinate (ammonium DL-homoalanin-4-yl(methyl)phosphinate), TCA sodium salt (sodium trichloronate), and combinations thereof.

According to one embodiment, the at least one pesticidal active ingredient is an insecticide. Suitable insecticides include, but are not limited to, organochlorines, organophosphates, azinphos-methyl, azinphos-ethyl, chlorpyrifos, chlorpyrifos-methyl, chlorfenvinphos, diazinon, dimethylvinphos, dioxabenzofos, disulfoton, ethion, EPN, fenitrothion, fenthion, heptenophos, isoxathion, malathion, methidathion, methyl-parathion, paraoxon, parathion, phenthoate, phosalone, phosmet, phorate, phoxim, pirimiphos-methyl, profenofos, prothiofos, primiphos-ethyl, pyraclofos, pyridaphenthion, sulprofos, triazophos, trichlorfon, tetrachlorvinphos, vamidothion; carbamates, alanycarb, benfuracarb, bendiocarb, carbaryl, carbofuran, carbosulfan, fenoxycarb, furathiocarb, indoxacarb, methiocarb, pirimicarb, propoxur, thiodicarb, triazamate, organosulfurs, carbamates, formamidines, dinitrophenols, organotins, pyrethroids, acrinathrin, allethrin, bioallethrin, barthrin, bioethanomethrin, cyclethrin, bifenthrin, cyfluthrin, beta-cyfluthrin, cycloprothrin, cypermethrin, cyphenothrin, deltamethrin, dimefluthrin, dimethrin, empenthrin, esfenvalerate, etofenprox, flufenprox, halfenprox, protifenbute, fenpirithrin, fenfluthrin, fenpropathrin, fenvalerate, flucythrinate, furethrin, imiprothrin, metofluthrin, cyhalothrin, lambda-cyhalothrin, gamma-cyhalothrin, permethrin, biopermethrin, transpermethrin, phenothrin, prallethrin, profluthrin, pyresmethrin, resmethrin, bioresmethrin, cismethrin, silafluofen, fluvalinate, tau-fluvalinate, tefluthrin, terallethrin, tetramethrin, tralomethrin, alpha-cypermethrin, beta-cypermethrin, theta-cypermethrin, zeta-cypermethrin, permethrin, nicotinoids, spinosyns, pyrazoles, pyridazinones, quinazolines, abamectin, acequinocyl, acetamiprid, amitraz, azadirachtin, bensultap, bifenazate, cartap, chlorfenapyr, chlordimeform, diafenthiuron, dinetofuran, diofenolan, emamectin, endosulfan, ethiprole, fenazaquin, fipronil, formetanate, formetanate hydrochloride, gamma-HCH, hydramethylnon, imidacloprid, indoxacarb, isoprocarb, metolcarb, pyridaben, pymetrozine, spinosad, tebufenpyrad, thiamethoxam, thiocyclam, pyridalyl, flonicamid, fluacypyrim, milbemectin, spiromesifen, flupyrazofos, tolfenpyrad, flubendiamide, bistrifluoron, benclothiaz, pyrafluprole, pyriprole, amidoflumet, flufenerim, cyflumetofen, acequinocyl, lepimectin, profluthrin, dimefluthrin, xylylcarb, bromopropylate, spirodiclofen, clofentezine, fenpyroxymate, hexythiazox, Fenvalerate (alpha-cyano-3-phenoxybe-nzyl-2-(4-chlorophenyl)-3-methylbutanoate), Baythroid (cyano-4-fluoro-3-phenoxybenzyl-3-(2,2-dichlorovinyl)-2,2-dimethylcyclopr-opanecarboxylate), DDVP (2,2-dichlorovinyldimethyl phosphate), Sumithion (MEP) (dimethyl 4-nitro-m-tolyl phosphorothioate), Malathion (S-1,2-bis(ethoxycarbonyl)ethyldimethyl phosphorodethioate), Dimethoate (dimethyl S-(N-methylcarbamoylmethyl) phosphorodithioate), Elsan (S-[alpha-(ethoxycarbonyl)benzyl]dimethyl phosphorodithioate), Baycid (dimethyl 4-methylthio-m-tolyl phosphorothioate), Bassa (O-sec-butylphenyl methylcarbamate), MTMC (m-tolylmethylcarbamate), Meopal (3,4-dimethylphenyl-N-methylcarbamate), NAC (1-naphthyl methylcarbamate), Methomyl (S-methyl-N-(methylcarbamoyloxy)thioacetimidate), Cartap (SS'-2-dimethylamino trimethylene bis-(thiocarbamate), cinnamon leaf oil, oregano oil, polyketide, pyrethrum, ryanodine, spinosad, spinosyn A, spinosyn D, thymol, *Bacillus sphaericus, Bacillus thuringiensis, Bacillus thuringiensis aizawi, Bacillus thuringiensis israelensis, Bacillus thuringiensis kurstaki, Bacillus thuringiensis tenebrionis*, nuclear polyhedrosis virus, granulovirus, *Lecanicillium lecanii*, diatomaceous earth, borate, borax, boric acid, and mixtures thereof.

According to one embodiment, the at least one pesticidal active ingredient is a bactericide. Suitable bactericides include any pesticidally acceptable bactericide. Such bactericides include, but are not limited to, validamycin, streptomycin, salmycin, envviromycin, 2-phenylphenol, thymol, 4-tert-amylphenol, 4-chloro-3-methylphenol, 4-chloro-2-benzylphenol and 4-chloro-3,5-dimethylphenol, 1,2-benzisothiazol-3(2H)-one (BIT), carbendazim, chlorotoluron, mixtures of 5-chloro-2-methyl-4-isothiazolin-3-one with 2-methyl-4-isothiazolin-3-one, 2,2-dibromo-3-nitrilopropionamide (DBNPA), fluometuron, 3-iodo-2-propynylbutyl carbamate (IPBC), isoproturon, 2-n-octyl-4-isothiazolin-3-one (OIT), prometryn, and propiconazole.

According to one embodiment, the at least one pesticidal active ingredient is at least one biopesticide. Suitable biopesticides includes those derived from natural products (naturally occurring), such as animals, plants, bacteria (e.g., Howler from AgBiome), and certain minerals. According to one embodiment, the at least one biopesticide is synthetic (not naturally occurring). The at least one biopesticide may be used to control pests or the microorganisms that control pests. Suitable biopesticides include, but are not limited to, the biopesticides registered as biopesticide active ingredients with the United States Environmental Protection Agency. Such suitable biopesticides include, but are not limited to, cold pressed neem oil, ulocladium oudemansii, lavandulyl senecioate, calcium acetae, 2-methyl-1-butanol, *Trichoderma asperellum, Trichoderma gamsii*, laminarin food use fungicide, (E,Z)-7,9-Dodecadien-1-yl acetate, abscisic acid, (Z,Z,E)-7,11,13-hexadecatrienal, coat protein gene of plum pox virus, homobrassinolide, *Chenopodium ambrosoides, Trichoderma hamatum* isolate, (Z,Z,E)-3,8,11-tetradecatrienyl acetate, cry1Ac in MON 87701, *Bacillus thuringiensis* Vip3Aa20, hydrogentated catmint oil, n-tetradecyl acetate, iron HEDTA, heptyl butyrate, sodium ferric EDTA, oriental mustard seed, Z-7-tetradeced-2-one, L-Lactic Acid, *Pasteuria usgae, Candida oleophila* strain O, yeast, trimethylamine, indole, L-carvone, fox urine, calcium lactate, *Chenopodium ambrosioides, B. firmus, Bacillus thuringiensis* Cry1A.105, *Bacillus thuringiensis* Cry2Ab2, vipcot, vip3Aa19, E,E-9,11-tetradecadienyl acetate, *Bacillus thuringiensis* modified Cray 3, R-octonol, indole-3-acetic acid, sorbitol octanoate, methyl eugenol, potassium silicate, ammonium nonaoate, cuelure, ammonium bicarbonate, black pepper oil, iperine, citronellol, glycerol monocaprylate, propylene glycol, lysophosphatidylethanolamines, corn gluten meal, dipotassium phosphate, sucrose octanoate esters, silver nitrate, formic acid, xanthine, verbenone, fish oil, kaolin, canola oil, potassium dihydrogen phosphate, maple lactone, anthrquinone, acetic acid, iron phosphate, polyoxin D zinc salt, dihydroazadirachtin, and mixtures thereof.

According to one embodiment, the at least one pesticidal active ingredient is a plant growth regulator. Suitable plant growth regulators include, but are not limited to, ancymidol, azoluron, chlorflurenol-methyl, flurprimidol, forchlorfenuron, indolylbutyric acid, mefluidide, 1-naphthylacetamide, 1-naphthylacetic acid, 2-naphthyloxyacetic acid (ester), paclobutrazol, thidiazuron, 3-CPA, 4-CPA, BAP, butifos, tribufos, butralin, chlorflurenol, clofencet, cyclanilide, daminozide, dicamba, dikegulac sodium, dimethipin, chlorfenethol, etacelasil, ethephon, ethychlozate, fenoprop, 2,4,5-TP, fluoridamid, flurprimidol, flutriafol, guazatin, imazalil, karetazan, kinetin, lactidichlor-ethyl, maleic hydrazide, naptalam, quinmerac, sintofen, tetcyclacis, triiodobenzoic acid, triapenthenol, triazethan, tribufos, trinexapac-ethyl, uniconazole, propham and gibberillic acid, gibberellins and combinations thereof.

According to one embodiment, the at least one pesticidal active ingredient is a nutritional.

According to one embodiment, the pesticidal compositions as provided herein include at least one additional component. According to one embodiment, the at least one additional component is citric acid, potassium hydroxide, cocodimethylamine, polyoxyethylene sorbitan monolaurate, at least one emulsifier compound, at least one antifoaming compound, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one preservative, at least one plasticizer, at least one hydrophobic barrier, at least one UV protectant, at least one water soluble solvent, or any combination thereof.

According to one embodiment, the at least one additional component is water. According to one embodiment, water may be utilized in the pesticidal composition at a temperature that is considered cold. According to such an embodiment, the cold water may have a temperature of between about 32.1° F. to about 49.9° F. According to another embodiment, the water may be utilized in the pesticidal composition at a temperature that is considered warm. According to such an embodiment, the warm water may have a temperature of between about 50.0° F. to about 90.0° F.

According to one embodiment, the pesticidal compositions as provided herein include typically from about 2% by weight (w/w) to about 80% by weight (w/w) of water, citric acid, potassium hydroxide, cocodimethylamine, polyoxyethylene sorbitan monolaurate, at least one emulsifier compound, at least one antifoaming compound, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one preservative, at least one plasticizer, at least one hydrophobic barrier, at least one UV protectant, at least one water soluble solvent, or any combination thereof.

According to one embodiment, the at least one additional component is one or more surfactant. Such a surfactant may be one or more of an ionic and a non-ionic surfactant. Such surfactants may be used as an emulsifier, dispersant, solubilizer, wetter, penetrant, protective colloid, or for other purposes. Suitable ionic surfactants for use with the pesticidal composition described herein may include anionic surfactants such as alkali, alkaline earth or ammonium salts of sulfonates, sulfates, phosphates, carboxylates, and mixtures thereof. Suitable sulfonates include, but are not limited to, alkylarylsulfonates, diphenylsulfonates, alpha-olefin sulfonates, lignin sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Suitable sulfates include, but are not limited to, sulfates of fatty acids and oils, of ethoxylated alkylphenols, of alcohols, of ethoxylated alcohols, or of fatty acid esters. Suitable phosphates include, but are not limited to, phosphate esters. Suitable carboxylates include, but are not limited to, alkyl carboxylates, and carboxylated alcohol or alkylphenol ethoxylates. Suitable anionic surfactants include, but are not limited to, sulfates and sulfonates.

According to one embodiment, the at least one additional component is one or more nonionic surfactant. Suitable nonionic surfactants include, but are not limited to, alkoxylates, N-substituted fatty acid amides, amine oxides, esters, sugar-based surfactants, polymeric surfactants, and mixtures thereof. Suitable alkoxylates include, but are not limited to, compounds such as alcohols, alkylphenols, amines, amides, arylphenols, fatty acids or fatty acid esters which have been alkoxylated with from 1 to 50 molar equivalents of an alkoxylating agent such as, for example, ethylene oxide (EO), propylene oxide (PO), or a combination thereof.

According to another embodiment, the one or more nonionic surfactant is an alcohol initiated EO/PO block copolymer such as a butanol initiated EO/PO block copolymer, which may also be known as a polyalkylene glycol monobutyl ether, a poly(ethylene glycol-co-propylene glycol) monobutyl ether, or a propylene oxide ethylene oxide polymer monobutyl ether. According to one embodiment, the butanol initiated EO/PO block copolymer may have a degree of ethoxylation of from about 20 to about 30 and a degree of propoxylation of from about 20 to about 30. Suitable examples of EO/PO block copolymers include, but are not limited to, Toximul® 8320 available from Stepan (Northfield, Ill.), Termul® 5429 available from Huntsman International LLC (The Woodlands, Tex.), Tergitol™ XD available from Dow Chemical (Midland, Mich.), and Ethylan™ NS 500LQ available from AkzoNobel (Chicago, Ill.).

According to one embodiment, the surfactant is one or more quaternary ammonium surfactant. Suitable quaternary ammonium surfactants include ARQUAD 2C-75 (available from Akzo Nobel, Chicago, Ill.), quaternary ammonium chloride salts, cocodimethyl and dicocodimethylammonium chloride, and other coco-substituted quaternary ammonium salts. According to one embodiment, the surfactant is one or more alkyl, primary, secondary or tertiary amine. According to one embodiment, the surfactant is one or more amine with alkyl groups or a linear alkenyl groups with a carbon number of 8 to 20. According to one embodiment, the surfactant is derived from natural oil or fat. According to one embodiment, the surfactant, includes one or more an oxyalkylene groups. Suitable amines include, but are not limited to, any of the ARMEEN aliphatic amines (available from Akzo Nobel), mono-long-chain alkylamine, for example, bis(2-hydroxyethyl)cocoamine, bis(2-hydroxyethyl)-tallowamine, bis(2-hydroxyethyl)oleylamine, and bis(2-hydroxyethyl)laurylamine, polyoxyalkylenated long-chain alkylamine, for example, bis(polyoxyethylene(EOp=3 to 30))cocoamine, bis(polyoxyethylene(EOp=3 to 30))tallowamine, bis(polyoxyethylene(EOp 3 to 30))oleylamine, bis(polyoxyethylene (EOp=3 to 30))laurylamine, bis(polyoxyethylene(EOp=3 to 30))palmstearylamine, bis(polyoxyethylene(EOp=3 to 10)polyoxypropylene-(POp=3 to 10)cocoamine, and bis (polyoxyethylene (EOp=3 to 10)polyoxypropylene (POp=3 to 10)tallowamine. In the compounds described above, EOp represents an average addition mole number of ethylene oxide, and POp represents an average addition mole number of propylene oxide.

According to one embodiment, the surfactant includes one or more chelating agent and one or more cation compound. Combinations of oxalic acid and citric acid may be utilized due to the combination's action as an effective permeabilizer without exhibiting toxicity on exposure. According to one embodiment, citric acid lowers oxalic acid toxicity and also functions as a permeabilizing agent.

According to one embodiment, the at least one additional component is at least one inert formulation ingredient Suitable inert formulation ingredients include, but are not limited to, dispersants, surfactants and wetting agents. Additional composition components may also include, for example, one or more ingredients, which may be dissolved or dispersed in the composition and may be selected from acaricides, algicides, antifeedants, avicides, bird repellents, chemosterilants, defoliants, desiccants, disinfectants, herbicide safeners, flow agents, insect attractants, insect repellents, mammal repellents, mating disrupters, molluscicides, nematicides, plant activators, plant growth regulators, rodenticides, semiochemicals, synergists, virucides, antifoam agents, antimicrobial agents, buffers, corrosion inhibitors, dispersing agents, dyes, fragrants, freezing point depressants, neutralizing agents, odorants, penetration aids, sequestering agents, spray drift control agents, spreading agents, stabilizers, sticking agents, viscosity-modifying additives, preservatives, plasticizers, hydrophobic barriers, UV protectants, water soluble solvents and mixtures thereof.

According to one embodiment, the at least one additional component is at least one flow agent. Suitable flow agents include, but are not limited to, clays such as kaolin, talc, diatomaceous earth and propylene glycol.

According to one embodiment, the at least one additional component is a component to aid in forming a film on the surface of a crop plant. Such a film forming component may include, but are not limited to, cellulose acetate, cellulose acetate-succinate, cellulose acetate phthalate, hydroxyethylcellulose, hydroxypropylcellulose, carboxymethylcellulose, carboxyethylcellulose, chitosan, methylcellulose, ethyl cellulose, propylcellulose, butylcellulose, alkylcelluloses, phthalate and acetate esters of cellulose, hypromellose, hypromellose acetate succinate, hypromellose phthalate, xanthan gum, guar gum, gellan gum, gum arabic, carageenan, alginic acid (and its salts), acacia, tragacanth, polyvinyl acetate, polyvinyl alcohol, polyvinylpyrolidone, polyvinylacetate phthalate, methacrylic-acrylic acid copolymer and its alkyl esters or ethers and combinations thereof.

According to one embodiment, the at least one additional component increases the adhesion of a particular component or composition to the target area (i.e., leaf). The adhesion component may aid in rain fastness. Suitable adhesion components include the film forming compounds provided herein, polyvinyl alcohol, polyvinylpyrolidone, or any combination thereof.

According to one embodiment, the at least one additional component increases the penetration of the pesticidal active ingredient. Suitable penetration components include, but are not limited to, oranosilicone-based surfactants.

According to one embodiment, the at least one additional component is a component that aids in drift control. Suitable drift control components include, but are not limited to, viscoelastic polymers.

According to one embodiment, the at least one additional component is a suitable base or pH control agent. According to a particular embodiment, the base is potassium hydroxide.

According to one embodiment, the at least one additional component is at least one permeabilizing agent. According to one embodiment, the at least one permeabilizing agent is at least one chelating agent. According to one embodiment, the at least one chelating agent is ethylenediaminetetraacetic acid (EDTA), diethylenetriaminepentaacetic acid (DTPA), (hydroxyethyl)ethylenediaminetriacetic acid (HEDTA), nitrilotriacetic acid (NTA), oxalic acid, citric acid, sugars, amino acids, organic diacids, diamines, alpha ketoacids, alphahydroxyacids, aminodiacids, amino tri-acids, amino tetra-acids, t-dol amines, organic polyacids (and their sodium, potassium, and ammonium salts), salts of maleic acid, malonic acid, tartaric acid, glycine, lactic acid, malic acid, succinic acid, dextrose, tris(hydroxymethyl)aminomethane, lactose, mannitol, glutaric acid, malic acid, succinic acid, glycerol, humic acid, fulvic acid, sorbic acid, sorbose, ethylene diamine, 1,2 diaminocyclohexane, trimethylenediamine, tetramethylenediamine, 1,2 diaminopropane, diethylenetriamine, triethylenetetramine, triaminodiethylamine, N-hydroxyethylethylenediamine, sodium polyphosphate, potassium polyphosphate, ammonium polyphosphate, sodium hexametaphosphate and mixtures thereof.

According to one embodiment, the at least one additional component is a water conditioning agent. Suitable water conditioning agents include, but are not limited to, pH buffering agents.

According to one embodiment, the at least one additional is at least one component or chemical disclosed by Harris in U.S. Pat. No. 9,113,625 and Miles in U.S. Pat. No. 7,476,646, the contents of which are each herein incorporated by reference.

A tank mix pesticidal composition is also provided. The tank mix composition may be applied directly to a target plant or pest. The tank mix pesticidal composition is particularly suited for direct application to at least one crop plant, the surrounding soil, turf, seed, or a combination thereof. The tank mix pesticidal composition reduces or eliminates at least one or more fungus, bacteria, weed, insect or other pest.

According to one embodiment, the tank mix pesticidal composition includes at least one pesticidal active ingredient, at least one pesticidal active ingredient and at least one organic solvent. According to one embodiment, the tank mix pesticidal composition further includes water, spray oil, or a combination thereof.

The at least one organic solvent included in the tank mix pesticidal composition is any organic solvent as provided herein. Suitable organic solvents include, but are not limited to, benzyl alcohol, propylene carbonate, N-methylpyrrolidone, benzyl acetate, benzyl butyrate, benzyl propionate, diethyl malonate, 3-methoxy-3-methyl-1-butanol, dimethyl benzyl carbinol acetate, phenyl ethyl alcohol, terpinyl acetate, benzyl benzoate, methyl sailcylate, hexyl acetate, benzyl butyrate, diethyl malonate, ethyl acetate, phenoxy ethyl iso-butyrate, terpineol, geranyl acetate, linalyl acetate, ethyl 2-methyl butyrate, propylene glycol diacetate, dipropylene glycol monomethyl ether, or any combination thereof. According to a particular embodiment, the at least one organic solvent included in the tank mix pesticidal composition is benzyl alcohol. According to a particular embodiment, the at least one organic solvent included in the tank mix pesticidal composition is benzyl acetate. According to a particular embodiment, the at least one organic solvent included in the tank mix pesticidal composition is propylene carbonate. According to a particular embodiment, the at least one organic solvent included in the tank mix pesticidal composition is N-methylpyrrolidone. According to one embodiment, the at least one active ingredient in the tank mix pesticidal composition at least one pesticidal active ingredient as provided herein. According to one embodiment, the at least one organic solvent in the tank mix pesticidal composition is benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof. According to one embodiment, the at least one organic solvent in the tank mix pesticidal composition is benzyl alcohol. At least one de-foamer composition may be added to the pesticidal composition at the time of mixing.

According to a particular embodiment, a tank mix pesticidal composition is provided that includes from typically about 0.01% w/w to about 10% w/w of at least one pesticidal active ingredient. According to a particular embodiment, a tank mix pesticidal composition is provided that includes from typically about 0.2% w/w to about 2 w/w % of at least one organic solvent. According to a particular embodiment, a tank mix pesticidal composition is provided that includes from typically about 80% w/w to about 99% of a water, spray oil (e.g., phytobland or paraffinic oil), or a combination thereof. The tank mix may also include from about 0.2% w/w to about 2.0% w/w of one or more of a solvent, emulsifier, preservative, or antifoaming compound.

The tank mix pesticidal compositions or as provided herein may be applied to plant leaves as foliar sprays, or to plant shoots, or to the surrounding soil or to seed. According to one embodiment, the tank mix pesticidal compositions as provided herein may be applied via a sprayer attached to a tank containing the pesticidal composition. According to one embodiment, the tank mix pesticidal compositions as provided herein may be applied via orchard sprayers, ground sprayers, row crop applicators, electrostatic sprayers, drone sprayers, helicopter sprayers, airplaner sprayers, or any other sprayer combatible for spraying the compositions as provided herein on agricultural and horticultural crops.

According to one embodiment, the tank mix pesticidal compositions as provided herein may be applied via an irrigation system (chemigation). According to one embodiment, the tank mix pesticidal compositions as provided herein may be applied as a drench treatment. According to one embodiment, the tank mix pesticidal compositions as provided herein may be applied as a wick system.

An alternative adjuvant composition is also provided. The adjuvant compositions as provided herein may be utilized to improve the efficacy of at least one active ingredient such as a fungicide, bactericide, herbicide, insecticide, pesticide, nutritional or biopesticide. According to one embodiment, the at least one pesticidal active ingredient may be sufficient to reduce, halt, or eliminate growth of various target pests such as fungi, bacteria, insects, or weeds. According to one embodiment, the adjuvant compositions as provided herein may be utilized to improve the efficacy of at least one pesticidal active ingredient such that the pesticidal active ingredient is more efficacious against at least one resistant pest such as a fungi, bacteria, insect or weed compared to when the active ingredient is utilized alone.

According to one embodiment, the adjuvant compositions include at least one organic solvent as provided herein. According to a particular embodiment, the at least one organic solvent included in the adjuvant composition is benzyl acetate. According to a particular embodiment, the at least one organic solvent included in the adjuvant composition is benzyl alcohol. According to a particular embodiment, the at least one organic solvent included in the pesticidal composition is propylene carbonate. According to a particular embodiment, the at least one organic solvent included in the pesticidal composition is N-methylpyrrolidone. According to one embodiment, the at least one organic solvent included in the adjuvant composition is benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof.

According to one embodiment, the adjuvant compositions as provided herein may further at least one additional component as provided herein. Particularly suitable additional components include, but are not limited to, water, citric acid, potassium hydroxide, cocodimethylamine, polyoxyethylene sorbitan monolaurate (commercially available as Tween™ 21), at least one emulsifier compound, at least one antifoaming compound, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one preservative, at least one plasticizer, at least one hydrophobic barrier, at least one UV protectant, at least one water soluble solvent, or any combination thereof.

According to one embodiment, the at least one additional component is water. According to one embodiment, water may be utilized in the adjuvant composition at a temperature that is considered cold. According to such an embodiment, the cold water may have a temperature of between about 32.1° F. to about 49.9° F. According to another embodiment, the water may be utilized in the adjuvant composition at a temperature that is considered warm. According to such an embodiment, the warm water may have a temperature of between about 50.0° F. to about 90.0° F.

According to one embodiment, the adjuvant composition includes typically at least from about 10% by weight (w/w) to about 98% by weight (w/w) of at least one organic solvent as provided herein. According to one embodiment, the adjuvant composition includes typically at least from about 20% by weight (w/w) of at least one organic solvent as provided herein. According to one embodiment, the adjuvant composition includes typically at least from about 30% by weight (w/w) of at least one organic solvent as provided herein. According to one embodiment, the adjuvant composition includes typically at least from about 40% by weight (w/w) of at least one organic solvent as provided herein. According to one embodiment, the adjuvant composition includes typically at least from about 50% by weight (w/w) of at least one organic solvent as provided herein. According to one embodiment, the adjuvant composition includes typically at least from about 60% by weight (w/w) of at least one organic solvent as provided herein. According to one embodiment, the adjuvant composition includes typically at least from about 70% by weight (w/w) of at least one organic solvent as provided herein. According to one embodiment, the adjuvant composition includes typically at least from about 75% by weight (w/w) of at least one organic solvent as provided herein. According to one embodiment, the adjuvant composition includes typically at least from about 80% by weight (w/w) of at least one organic solvent as provided herein.

According to one embodiment, the adjuvant composition includes typically at least from about 2% by weight (w/w) to about 90% by weight (w/w) of at least one additional component as provided herein. According to one embodiment, the adjuvant composition includes typically at least from about 5% by weight (w/w) of at least one additional component as provided herein. According to one embodiment, the adjuvant composition includes typically at least from about 10% by weight (w/w) of at least one additional component as provided herein. According to one embodiment, the adjuvant composition includes typically at least from about 15% by weight (w/w) of at least one additional component as provided herein. According to one embodiment, the adjuvant composition includes typically at least from about 20% by weight (w/w) of at least one additional component as provided herein. According to one embodiment, the adjuvant composition includes typically at least from about 25% by weight (w/w) of at least one additional component as provided herein. According to one embodiment, the adjuvant composition includes typically at least from about 35% by weight (w/w) of at least one additional component as provided herein. According to one embodiment, the adjuvant composition includes typically at least from about 45% by weight (w/w) of at least one additional component as provided herein. According to one embodiment, the adjuvant composition includes typically at least from about 55% by weight (w/w) of at least one additional component as provided herein. According to one embodiment, the adjuvant composition includes typically at least from about 65% by weight (w/w) of at least one additional component as provided herein. According to one embodiment, the adjuvant composition includes typically at least from about 75% by weight (w/w) of at least one additional component as provided herein. According to one embodiment, the adjuvant composition includes typically at least from about 85% by weight (w/w) of at least one additional component as provided herein.

According to a particular embodiment, the adjuvant composition typically includes from about 0.0% w/w to about 2.0% w/w water. According to a particular embodiment, the adjuvant composition typically includes about 0.4% w/w water. According to a particular embodiment, the adjuvant composition typically includes from about 0.0% w/w to about 2.0% w/w citric acid. According to a particular embodiment, the adjuvant composition typically includes about 0.2% w/w citric acid. According to a particular embodiment, the adjuvant composition typically includes from about 0.0% w/w to about 2.0% w/w potassium hydroxide. According to a particular embodiment, the adjuvant composition typically includes about 0.2% w/w potassium hydroxide. According to a particular embodiment, the adjuvant composition typically includes from about 0.0% w/w to about 2.0% w/w cocodimethylamine. According to a particular embodiment, the adjuvant composition typically includes about 0.2% w/w cocodimethylamine. According to a particular embodiment, the adjuvant composition typically includes from about 20% w/w to about 99% w/w of at least one organic solvent. According to a particular embodiment, the at least one organic solvent is benzyl acetate, propylene carbonate, N-methylpyrrolidone, or any combination thereof. According to a particular embodiment, the adjuvant composition typically includes about 74% w/w benzyl acetate. According to a particular embodiment, the adjuvant composition typically includes from about 10% w/w to about 70% w/w of at least on surfactant. According to one embodiment, the at least one surfactant is polyoxyethylene sorbitan monolaurate. According to a particular embodiment, the adjuvant composition typically includes about 25% w/w polyoxyethylene sorbitan monolaurate.

According to a particular embodiment, the organic solvent is applied at an effective rate of typically at least about 0.1 fluid ounces/acre. According to a particular embodiment, the organic solvent is applied at an effective rate of typically at least about 1 fluid ounces/acre. According to a particular embodiment, the organic solvent is applied at an effective rate of typically at least about 2 fluid ounces/acre. According to a particular embodiment, the organic solvent is applied at an effective rate of typically at least about 3 fluid ounces/acre. According to a particular embodiment, the organic solvent is applied at an effective rate of typically at least about 4 fluid ounces/acre. According to a particular embodiment, the organic solvent is applied at an effective rate of typically at least about 5 fluid ounces/acre. According to a particular embodiment, the organic solvent is applied at an effective rate of typically at least about 6 fluid ounces/acre. According to a particular embodiment, the organic solvent is applied at an effective rate of typically at least about 7 fluid ounces/acre. According to a particular embodiment, the organic solvent is applied at an effective rate of typically at least about 8 fluid ounces/acre. According to a particular embodiment, the organic solvent is applied at an effective rate of typically at least about 9 fluid ounces/acre. According to a particular embodiment, the organic solvent is applied at an effective rate of typically at least about 10 fluid ounces/acre. According to a particular embodiment, the organic solvent is applied at an effective rate of typically at least about 11 fluid ounces/acre. According to a particular embodiment, the organic solvent is applied at an effective rate of typically at least about 12 fluid ounces/acre. According to a particular embodiment, the organic solvent is applied at an effective rate of typically at least about 13 fluid ounces/acre. According to a particular embodiment, the organic solvent is applied at an effective rate of typically at least about 14 fluid ounces/acre. According to a particular embodiment, the organic solvent is applied at an effective rate of typically less than about 15 fluid ounces/acre.

According to one aspect, a plant is provided that includes a pesticidal composition, adjuvant composition, or a tank mix pesticidal composition on a surface thereof.

According to one aspect, a kit is provided. The kit includes a container that includes an adjuvant composition or pesticidal composition as provided herein. The kit may optionally include instructions for use.

A method of producing an adjuvant composition for use in combination with at least one pesticidal active ingredient is provided. The method includes the step of introducing at least one organic solvent to a container. The at least one organic solvent includes benzyl alcohol, propylene carbonate, N-methylpyrrolidone, benzyl acetate, benzyl butyrate, benzyl propionate, diethyl malonate, 3-methoxy-3-methyl-1-butanol, dimethyl benzyl carbinol acetate, phenyl ethyl alcohol, terpinyl acetate, benzyl benzoate, methyl sailcylate, hexyl acetate, benzyl butyrate, diethyl malonate, ethyl acetate, phenoxy ethyl iso-butyrate, terpineol, geranyl acetate, linalyl acetate, ethyl 2-methyl butyrate, propylene glycol diacetate, dipropylene glycol monomethyl ether, or any combination thereof. According to one embodiment, the at least one organic is benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof. According to a particular embodiment, the organic solvent is benzyl alcohol. The method optionally includes the step of introducing at least one additional component to the container. The at least one additional component includes water, citric acid, potassium hydroxide, cocodimethylamine, polyoxyethylene sorbitan monolaurate, at least one emulsifier compound, at least one antifoaming compound, at least one antimicrobial agent, at least one buffer, at least one corrosion inhibitor, at least one dispersing agent, at least one dye, at least one fragrant, at least one freezing point depressant, at least one neutralizing agent, at least one odorant, at least one penetration aid, at least one sequestering agent, at least one spray drift control agent, at least one spreading agent, at least one stabilizer, at least one sticking agent, at least one viscosity-modifying additive, at least one preservative, at least one plasticizer, at least one hydrophobic barrier, at least one UV protectant, at least one water soluble solvent, or any combination thereof. The method optionally includes the step of attaching at least one set of instructions to the container.

The at least one organic solvent is introduced to the container in an amount such that entire contents of the container may be added directly to a spray tank containing at least one pesticidal active ingredient. According to a particular embodiment, at least one organic solvent is benzyl acetate. According to a particular embodiment, at least one organic solvent is benzyl alcohol. According to one embodiment, the adjuvant composition increases the efficacy of the at least one pesticidal active ingredient by at least about 5%, 10%, 15%, 20% 25%, 30%, 35%, 40%, 45%, 50%, 55%, 60%, 65%, 70%, 75%, 80%, 85%, 90%, 95% or more compared to the at least one pesticidal active ingredient alone. According to one embodiment, the at least one pesticidal active ingredient is a fungicide, bactericide, herbicide, insecticide, pesticide, plant growth regulator, or biopesticide.

According to one embodiment, the adjuvant composition is added or mixed with the at least one active ingredient and water or spray oil in a tank at the time of spraying. According to one embodiment, limited amounts of the adjuvant composition are sufficient to increase the efficacy of the active ingredient by reducing the potential for phytotoxicity and leaving a portion of the active ingredient in solid form for residual activity.

A method of preparing a pesticidal composition is also provided. The method includes the steps of combining, within a container, at least one organic solvent as provided herein, at least one pesticidal active ingredient as provided herein, and, optionally, or more additional components as provided herein.

A method of enhancing or otherwise increase the efficacy of a pesticidal active ingredient is provided. The method includes the step of introducing at least one adjuvant composition to at least one pesticidal active ingredient. The method includes the step of introducing a pesticidal composition to the surface of the at least one plant, the surrounding soil, turf, seed, or a combination thereof. The pesticidal composition may be introduced by root drench, aerial spray (drone, helicopter, crop duster/plane), ground spray, orchard spray, chemigation, or drip irrigation. The pesticidal composition that is introduced includes any pesticidal composition provided herein. The step of introduction may include mixing. The at least one adjuvant composition includes at least one organic solvent selected from the group consisting of propylene carbonate, N-methylpyrrolidone, benzyl acetate, benzyl butyrate, benzyl propionate, diethyl malonate, 3-methoxy-3-methyl-1-butanol, dimethyl benzyl carbinol acetate, phenyl ethyl alcohol, terpinyl acetate, benzyl benzoate, methyl sailcylate, hexyl acetate, benzyl butyrate, diethyl malonate, ethyl acetate, phenoxy ethyl iso-butyrate, terpineol, geranyl acetate, linalyl acetate, ethyl 2-methyl butyrate, propylene glycol diacetate, dipropylene glycol monomethyl ether, or any combination thereof. According to one embodiment, the at least one organic is benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof. According to one embodiment, the efficacy of the active ingredient is increased by at least about 5%, 10%, 15%, 20% 25%, 30%, 35%, 40%, 45%, 50%, 55%, 60%, 65%, 70%, 75%, 80%, 85%, 90%, 95% or more compared to application of the pesticidal active ingredient without the adjuvant composition. According to one embodiment, the at least one active ingredient is a fungicide, bactericide, herbicide, insecticide, pesticide, or biopesticide. According to one embodiment, the organic solvent is benzyl acetate. According to a particular embodiment, the organic solvent is benzyl alcohol.

A method of improving the quality of at least one target plant is provided. The target plant may be an agronomic plant, horticultural plant or economically significant turf grass. The method includes the step of applying a pesticidal composition to the surface of the at least one plant, the surrounding soil, turf, seed, or a combination thereof. The pesticidal composition may be introduced by root drench, aerial spray (drone, helicopter, crop duster/plane), ground spray, orchard spray, chemigation, or drip irrigation. The pesticidal composition that is applied includes any pesticidal composition provided herein. The pesticidal composition that is applied includes at least one pesticidal active ingredient and at least one organic solvent. The at least one organic solvent may be benzyl alcohol, propylene carbonate, N-methylpyrrolidone, benzyl acetate, benzyl butyrate, benzyl propionate, diethyl malonate, 3-methoxy-3-methyl-1-butanol, dimethyl benzyl carbinol acetate, phenyl ethyl alcohol, terpinyl acetate, benzyl benzoate, methyl sailcylate, hexyl acetate, benzyl butyrate, diethyl malonate, ethyl acetate, phenoxy ethyl iso-butyrate, terpineol, geranyl acetate, linalyl acetate, ethyl 2-methyl butyrate, propylene glycol diacetate, dipropylene glycol monomethyl ether, or any combination thereof. According to one embodiment, the at least one organic is benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof. The method improves the quality of at least one crop by reducing or eliminating at least one or more fungus, bacteria, weed, insect or other pest thereby reducing such pressures and improving the quality of the crop. The at least one active ingredient utilized in the method may be a fungicide, bactericide, herbicide, insecticide, pesticide, or biopesticide. According to a particular embodiment, the organic solvent is benzyl acetate. According to a particular embodiment, the organic solvent is benzyl alcohol. According to a particular embodiment, the organic solvent is benzyl alcohol.

A method of increasing yield of a crop is provided. The method includes the step of applying a pesticidal composition to the surface of the at least one plant, the surrounding soil, turf, seed, or a combination thereof. The pesticidal composition may be introduced by root drench, aerial spray (drone, helicopter, crop duster/plane), ground spray, orchard spray, chemigation, or drip irrigation. The pesticidal composition that is applied includes any pesticidal composition provided herein. The pesticidal composition that is applied includes at least one pesticidal active ingredient and at least one organic solvent. The at least one organic solvent may be benzyl alcohol propylene carbonate, N-methylpyrrolidone, benzyl acetate, benzyl butyrate, benzyl propionate, diethyl malonate, 3-methoxy-3-methyl-1-butanol, dimethyl benzyl carbinol acetate, phenyl ethyl alcohol, terpinyl acetate, benzyl benzoate, methyl sailcylate, hexyl acetate, benzyl butyrate, diethyl malonate, ethyl acetate, phenoxy ethyl iso-butyrate, terpineol, geranyl acetate, linalyl acetate, ethyl 2-methyl butyrate, propylene glycol diacetate, dipropylene glycol monomethyl ether, or any combination thereof. According to one embodiment, the at least one organic is benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof. The method reduces or eliminates at least one or more fungus, bacteria, weed, insect or other pest thereby increasing crop yield. The at least one active ingredient utilized in the method may be a fungicide, bactericide, herbicide, insecticide, pesticide, or biopesticide. According to a particular embodiment, the organic solvent is benzyl acetate. According to a particular embodiment, the organic solvent is benzyl alcohol.

A method of reducing post blossom fruit drop is provided. The method includes the step of applying a pesticidal composition to the surface of the at least one plant, the surrounding soil, turf, seed, or a combination thereof. The pesticidal composition may be introduced by root drench, aerial spray (drone, helicopter, crop duster/plane), ground spray, orchard spray, chemigation, or drip irrigation. The pesticidal composition that is applied includes any pesticidal composition provided herein. The pesticidal composition that is applied includes at least one pesticidal active ingredient and at least one organic solvent. The at least one organic solvent may be benzyl alcohol, propylene carbonate, N-methylpyrrolidone, benzyl acetate, benzyl butyrate, benzyl propionate, diethyl malonate, 3-methoxy-3-methyl-1-butanol, dimethyl benzyl carbinol acetate, phenyl ethyl alcohol, terpinyl acetate, benzyl benzoate, methyl sailcylate, hexyl acetate, benzyl butyrate, diethyl malonate, ethyl acetate, phenoxy ethyl iso-butyrate, terpineol, geranyl acetate, linalyl acetate, ethyl 2-methyl butyrate, propylene glycol diacetate, dipropylene glycol monomethyl ether, or any combination thereof. According to one embodiment, the at least one organic is benzyl acetate, benzyl alcohol, phenyl ethyl alcohol, hexyl acetate, terpinyl acetate, terpineol, geranyl acetate, linalyl acetate, propylene glycol diacetate, benzyl propionate, dipropylene glycol monomethyl ether, propylene carbonate, 3-Methoxy-3-methyl-1-butanol, N-methylpyrrolidone, or any combination thereof. The method reduces post blossom fruit drop by reducing or eliminating at least one or more fungus, bacteria, weed, insect or other pest. The at least one active ingredient utilized in the method may be a fungicide, bactericide, herbicide, insecticide, pesticide, or biopesticide. According to a particular embodiment, the organic solvent is benzyl acetate. According to a particular embodiment, the organic solvent is benzyl alcohol.

Although specific embodiments of the present invention are herein illustrated and described in detail, the invention is not limited thereto. The above detailed descriptions are provided as exemplary of the present invention and should not be construed as constituting any limitation of the invention. Modifications will be obvious to those skilled in the art, and all modifications that do not depart from the spirit of the invention are intended to be included with the scope of the appended claims.

EXAMPLE 1

Testing was conducted to evaluate the effectiveness of tebuconazole (referred to as "Teb") compositions against a natural population of black rust (*Puccinia graminis tritici*) on wheat. Two concentrations of adjuvant (benzyl alcohol) were utilized with two different mixing water temperatures (70° F. or 35° F.). An emulsifier, polyoxyethylenesorbitan monolaurate (available from Sigma Aldrich as Tween 21), was included in the spray mix to ensure adequate mixing.

Each tebuconazole composition was prepared and immediately sprayed on a wheat field. The tebuconazole application rate was 2 fluid ounces/acre. The benzyl alcohol application rate was varied between 3 fluid ounces/acre and 6 fluid ounces/acre. Disease severity was rated at weekly intervals. The data summarized in Table 1 is week three data, 21 days after the treatments were applied. In summary, both six ounces and three ounces per acre mixture rates of benzyl alcohol-containing pesticidal compositions (plus Tween™ 21) mixed with either cold or warm water were shown to be statistically more efficacious than the same rate of tebuconazole without benzyl alcohol.

TABLE 1

| Treatment | Adjuvant | Adjuvant Rate (oz/acre) | Mix Water Temp. | Disease Severity Rating | Percent Increase in Efficacy | Statistical Group |
|---|---|---|---|---|---|---|
| Teb only | None | n/a | 70° F. | 47 | n/a | abc |
| Teb only | None | n/a | 35° F. | 51.3 | n/a | abc |
| Teb plus Benzyl Alcohol | Benzyl Alcohol | 6 | 70° F. | 18.3 | 61% | j-m |
| Teb plus Benzyl Alcohol | Benzyl Alcohol | 6 | 35° F. | 25.5 | 50% | h-l |
| Teb plus Benzyl Alcohol | Benzyl Alcohol | 3 | 70° F. | 27.8 | 41% | g-k |
| Teb plus Benzyl Alcohol | Benzyl Alcohol | 3 | 35° F. | 23.3 | 55% | i-m |

EXAMPLE 2

Testing was done in petri dishes to evaluate the efficacy of Quadris (active ingredient azoxystrobin (methyl (E)-2-{2-[6-(2-cyanophenoxy) pyrimidin-4-yloxy]phenyl}-3-methoxyacrylate); broad-spectrum fungicide) to control a Didymella fungus that is resistant to azoxystrobin and causes watermelon stem rot. The Quadris application rate utilized was 12 fluid ounces/acre and 6 fluid ounces/acre (typical commercial use rate). The benzyl alcohol rate was 6 fluid ounces/acre and 3 fluid ounces/acre.

Following standard bioassay protocols, agar was impregnated with Quadris and/or benzyl alcohol at different rates and then a plug of the active Didymella was inserted in the middle of the plate. Radial growth was measured at 24 hour intervals. Observations documented lack of control of resistant strain by Quadris but excellent control when benzyl alcohol is added to the Quadris. The results are summarized in Table 2 and Table 3 and illustrated in FIG. 1 and FIG. 2. Benzyl Alcohol alone exhibited no reduction in fungal growth.

TABLE 2

| Treatment | Quadris Rate (oz/ac) | Benzyl Alcohol Rate (oz/ac) | 24 Hours | 48 Hours | 72 Hours | 96 Hours | 120 Hours | 144 Hours | Reduction of Didymella (%) |
|---|---|---|---|---|---|---|---|---|---|
| Check/Control | n/a | n/a | 6.17 | 9.87 | 12.98 | 16.55 | 22.6 | 28.88 | n/a |
| Quadris only | 12 | 0 | 3 | 3.88 | 5.3 | 7.72 | 10.4 | 18.93 | 34% |
| Benzyl Alcohol only | 0 | 6 | 4.83 | 8.42 | 8.7 | 13.98 | 18.72 | 25.05 | n/a |
| Quadris plus Benzyl Alcohol | 12 | 6 | 3 | 3 | 3.25 | 3.88 | 4.2 | 4.8 | 83% |
| Quadris plus Benzyl Alcohol | 12 | 3 | 3 | 3 | 3 | 3.12 | 3.37 | 4.15 | 86% |

TABLE 3

| Treatment | Quadris Rate (oz/ac) | Benzyl Alcohol Rate (oz/ac) | 24 Hours | 48 Hours | 72 Hours | 96 Hours | 120 Hours | 144 Hours | Reduction of Didymella (%) |
|---|---|---|---|---|---|---|---|---|---|
| Check/Control | n/a | n/a | 6.17 | 9.87 | 12.98 | 16.55 | 22.6 | 28.88 | n/a |
| Quadris only | 6 | 0 | 5 | 6.62 | 9.88 | 13.63 | 19.65 | 25.88 | 10% |
| Benzyl Alcohol only | 0 | 6 | 4.83 | 8.42 | 8.7 | 13.98 | 18.72 | 25.05 | n/a |
| Quadris plus Benzyl Alcohol | 6 | 6 | 3.87 | 3.87 | 3.98 | 4.83 | 5.73 | 6.6 | 77% |
| Quadris plus Benzyl Alcohol | 6 | 3 | 3.2 | 3.47 | 3.77 | 4.18 | 4.52 | 6.8 | 76% |

EXAMPLE 3

Stability of In-Can Adjuvant Compositions

Benzyl alcohol can be used as a component of the formulation for a commercial agrochemical, thus simplifying the use of benzyl alcohol for improving efficacy by avoiding the requirement of adding the benzyl alcohol as a separate tank-mix adjuvant. The resulting composition is sometimes referred to as an "in-can" adjuvant composition (i.e., includes a pesticidal active ingredient, active adjuvant and other key components other than water).

Testing was conducted to evaluate using benzyl alcohol as the adjuvant within "in-can" adjuvant compositions as set forth in Table 4 (tebuconazole emulsifiable concentrate) and Table 5 (abamectin emulsifiable concentrate). The adjuvant compositions were found to be stable for months in the temperature range experienced in the distribution chain for agrochemical products in the USA (up to 54° C. and down to 2° C.). Emulsifiers were added to these compositions to ensure adequate mixing into water for spraying crops. The adjuvant compositions were found stable at 54° C. and 2° C. for 30 days and dispersed well into water.

TABLE 4

Tebuconazole

| | Grams | Percent by Weight |
|---|---|---|
| Tebuconazole | 4 | 20.0 |
| Benzyl Alcohol | 7.45 | 37.3 |
| AgSolex 8 | 7.45 | 37.3 |
| Tween 21 | 1 | 5.0 |
| Proxel GXL | 0.05 | 0.3 |
| Antifoam | 0.05 | 0.3 |
| | 20 | |

Upon preparation of the adjuvant composition set forth in Table 4, the initial appearance was a clear solution with no solids, and the adjuvant composition emulsified readily into water and the emulsion was stable for twenty minutes without agitation, thus providing a commercially viable spray mixture for application to crops. After storage at 54° C. and at 2 C, the adjuvant composition remained clear with no solids, and The adjuvant composition emulsified readily into water and the emulsion was stable for twenty minutes without agitation, thus providing a commercially viable spray mixture for application to crops.

TABLE 5

Abamectin

| | Grams | Percent by Weight |
|---|---|---|
| Abamectin | 4 | 20.0 |
| Benzyl Alcohol | 7.45 | 37.3 |
| AgSolex 8 | 7.45 | 37.3 |
| Tween 21 | 1 | 5.0 |
| Proxel GXL | 0.05 | 0.3 |
| Antifoam | 0.05 | 0.3 |
| | 20 | |

Upon preparation of the adjuvant composition set forth in Table 5, the initial appearance was a clear solution with no solids. The adjuvant composition emulsified readily into water and the emulsion was stable for twenty minutes without agitation, thus providing a commercially viable spray mixture for application to crops. After storage at 54° C. and at 2° C., the adjuvant composition remained clear with no solids. The adjuvant composition emulsified readily into water and the emulsion was stable for twenty minutes without agitation, thus providing a commercially viable spray mixture for application to crops.

EXAMPLE 4

Stability of Ready-To-Use Compositions

Ready-To-Use (RTU) compositions are popular for residential use since no mixing, additions or pouring is required. RTU compositions are typically sold in 8 to 24 fluid ounce hand spray bottles in retail outlets.

Testing was undertaken to evaluate if benzyl alcohol could be used to form a stable RTU composition. The RTU composition is set forth in Table 6.

TABLE 6

RTU Azoxystrobin with Benzyl Alcohol

| | Percent by Weight |
|---|---|
| Azoxystrobin | 0.5 |
| Benzyl Alcohol | 1.0 |
| Tween 21 | 1.0 |
| Water | 97.5 |
| | 100.0 |

EXAMPLE 5

Testing was conducted to evaluate the impact of benzyl alcohol on woody brush control using Metsulfuron Methyl (MSM—methyl 2-[((4-methoxy-6-methyl-1,3,5-triazin-2-yl)carbamoylsulfamoyl]benzoate). A natural population of lowland brush was sprayed with: (1) MSM alone; (2) MSM plus conventionally used adjuvant (Nonionic surfactant, or NIS); and (3) MSM plus benzyl alcohol—each at 3 fluid ounces/acre and at 6 fluid ounces/acre. All treatments used the same rate of MSM (⅕ oz/gallon). The rating at 28 Days After Treatment (DAT) showed enhanced control of the brush population using benzyl alcohol at both 3 fluid ounces/acre and 6 fluid ounces/acre. Additional observations are noted in Table 7.

TABLE 7

| Treatment | MSM Rate | NIS Rate | Benzyl Alcohol Rate | Observation at 28 DAT |
|---|---|---|---|---|
| Untreated | n/a | n/a | n/a | 1.0 |
| MSM Alone | 1/5 oz/gal | n/a | n/a | 2.0 |
| MSM plus NIS | 1/5 oz/gal | 0.25% v/v | n/a | 2.0 |
| MSM plus Benzyl Alcohol | 1/5 oz/gal | n/a | 6 fl oz/acre | 3.0 |
| MSM plus Benzyl Alcohol | 1/5 oz/gal | n/a | 3 fl oz/acre | 4.25 |

Observation Scale

1 = no damage to plant
2 = some defoliation but greater than 70% green leaves remaining; all small branches still alive (bend without breaking)
3 = greater than 30% green leaves remaining; some branches less than 1/4 inch bend without breaking
4 = no green leaves; all branches less than 1/4 inch are dead (break when bent)
5 = 100% dead; no green leaves; all branches break when bent

EXAMPLE 6

A test was conducted to evaluate the impact on efficacy when an herbicide was combined with benzyl alcohol to control of sweetgum. Three to four foot tall sweetgum trees were sprayed with: (1) Crossroad® (a mixture of Triclopyr and 2,4-D ester) plus Methylated Soybean Oil (MSO, the adjuvant typically used) at a use rate of 0.25% v/v; (2) Crossroad® plus Benzyl Acetate at a use rate of 6 fluid ounces/acre; and (3) Crossroad® plus benzyl alcohol at a use rate of 6 fluid ounces/acre. The use rate for the Crossroad® was the same in all treatments. Each treatment was replicated five times. The ratings at nine days after treatment indicated that benzyl alcohol increased the efficacy. Additional observations are noted in Table 8.

TABLE 8

| Treatment | Adjuvant | Use Rate | Observation at 9 DAT |
|---|---|---|---|
| Crossroad® | MSO | 0.25% v/v | 3.1 |
| Crossroad® | Benzyl Acetate | 6 fl oz/acre | 2.5 |
| Crossroad® | Benzyl Alcohol | 6 fl oz/acre | 3.3 |

Observation Scale

1 = no change to plant
2 = tips dead; most of the leaves on stems green and not desiccated
3 = tips dead, leaves on stems discolored, some leaves desiccated
4 = tips dead; leaves on stems defoliated or desiccated, 1-2 green leaves at base on stem
5 = 100% dead

The invention claimed is:

1. A method of increasing the efficacy of at least one strobilurin fungicide against a strobilurin fungicide resistant fungus, the method comprising the step of:
applying a strobilurin fungicidal composition to the strobilurin fungicide resistant fungus, the strobilurin fungicidal composition consisting of benzyl alcohol, at least one strobilurin fungicide, water, and, optionally, at least one formulation ingredient selected from the group consisting of an emulsifier, a preservative and antifoaming compound;
wherein the efficacy of the strobilurin fungicide is increased against the strobilurin fungicide resistant fungus by at least about 50% compared to application of the strobilurin fungicide alone.

2. The method of claim 1, wherein the at least one strobilurin fungicide is azoxystrobin.

3. The method of claim 1, wherein the strobilurin fungicide resistant fungus is didymella.

4. The method of claim 1, wherein the benzyl alcohol is applied at a rate of between about 3 fluid ounces/acre and 6 fluid ounces/acre.

5. The method of claim 1, further comprising the step of mixing an effective amount of benzyl alcohol, at least one formulation ingredient and water with the at least one strobilurin fungicide.

6. The method of claim 1, wherein the strobilurin fungicidal composition is formulated as an in-can composition consisting of:

from about 10% w/w to about 30% w/w of the strobilurin fungicide;

from about 30% w/w to about 50% w/w benzyl alcohol; and from about 40% w/w to about 50% w/w water and at least one formulation ingredient.

7. The method of claim 1, wherein the strobilurin fungicidal composition is formulated as a ready-to-use composition consisting of:

from about 0.01% w/w to about 5.0% w/w of the strobilurin fungicide;

from about 0.1% w/w to about 10.0% w/w benzyl alcohol;

from about 0.2% w/w to about 2.0% w/w of the at least one formulation ingredient; and from about 80% w/w to about 99.9% w/w water.

8. A method of increasing the efficacy of at least one sulfonylurea herbicide against a sulfonylurea herbicide resistant plant, the method comprising the step of:

applying a sulfonylurea herbicide composition to the sulfonylurea herbicide resistant plant, the sulfonylurea herbicide composition consisting of benzyl alcohol, at least one sulfonylurea herbicide, water, and, optionally, at least one formulation ingredient selected from the group consisting of an emulsifier, a preservative and antifoaming compound;

wherein the efficacy of the sulfonylurea herbicide is increased against the sulfonylurea herbicide resistant plant by at least about 50% compared to application of the sulfonylurea herbicide alone.

9. The method of claim 8, wherein the at least one sulfonylurea herbicide is methyl 2-[((4-methoxy-6-methyl-1,3,5-triazin-2-yl)carbamoylsulfamoyl]benzoate.

10. The method of claim 8, wherein the sulfonylurea herbicide resistant plant is woody brush vegetation.

11. The method of claim 8, wherein the benzyl alcohol is applied at a rate of between about 3 fluid ounces/acre and 6 fluid ounces/acre.

12. The method of claim 8, further comprising the step of mixing an effective effective amount of benzyl alcohol, at least one formulation ingredient and water with the at least one sulfonylurea herbicide.

13. The method of claim 8, wherein the sulfonylurea herbicide composition is formulated as an in-can composition consisting of:
from about 10% w/w to about 30% w/w of the sulfonylurea herbicide;
from about 30% w/w to about 50% w/w benzyl alcohol; and
from about 40% w/w to about 50% w/w water and at least one formulation ingredient.

14. The method of claim 8, wherein the sulfonylurea herbicide composition is formulated as a ready-to-use composition consisting of:
from about 0.01% w/w to about 5.0% w/w of the sulfonylurea herbicide;
from about 0.1% w/w to about 10.0% w/w benzyl alcohol;
from about 0.2% w/w to about 2.0% w/w of the at least one formulation ingredient; and
from about 80% w/w to about 99.9% w/w water.

15. A method of increasing the efficacy of at least one triazole fungicide against a triazole fungicide resistant fungus, the method comprising the step of:
applying a triazole fungicidal composition to the triazole fungicide resistant fungus, the triazole fungicidal composition consisting of benzyl alcohol, at least one triazole fungicide, water, and, optionally, at least one formulation ingredient selected from the group consisting of an emulsifier, a preservative and antifoaming compound;
wherein the efficacy of the triazole fungicide is increased against the triazole fungicide resistant fungus by at least about 50% compared to application of the triazole fungicide alone.

16. The method of claim 1, wherein the at least one triazole fungicide is tebuconazole.

17. The method of claim 1, wherein the triazole fungicide resistant fungus is *Puccinia graminis tritici*.

18. The method of claim 1, wherein the benzyl alcohol is applied at a rate of between about 3 fluid ounces/acre and 6 fluid ounces/acre.

19. The method of claim 1, further comprising the step of mixing an effective amount of benzyl alcohol, at least one formulation ingredient and water with the at least one triazole fungicide.

20. The method of claim 1, wherein the triazole fungicidal composition is formulated as an in-can composition consisting of:

from about 10% w/w to about 30% w/w of the triazole fungicide;

from about 30% w/w to about 50% w/w benzyl alcohol; and from about 40% w/w to about 50% w/w water and at least one formulation ingredient.

21. The method of claim 1, wherein the triazole fungicidal composition is formulated as a ready-to-use composition consisting of:

from about 0.01% w/w to about 5.0% w/w of the triazole fungicide;

from about 0.1% w/w to about 10.0% w/w benzyl alcohol;

from about 0.2% w/w to about 2.0% w/w of the at least one formulation ingredient; and from about 80% w/w to about 99.9% w/w water.

* * * * *

UNITED STATES PATENT AND TRADEMARK OFFICE
CERTIFICATE OF CORRECTION

| | |
|---|---|
| PATENT NO. | : 11,503,829 B2 |
| APPLICATION NO. | : 17/315476 |
| DATED | : November 22, 2022 |
| INVENTOR(S) | : James Holt LeFiles |

Page 1 of 1

It is certified that error appears in the above-identified patent and that said Letters Patent is hereby corrected as shown below:

On the Title Page

Item (73) The Assignee name "GJB APPLIED TECHNOLOGIES, INC." should be "CJB APPLIED TECHNOLOGIES, INC."

Signed and Sealed this
Tenth Day of January, 2023

Katherine Kelly Vidal
*Director of the United States Patent and Trademark Office*